US012752643B2

(12) United States Patent
Tomimoto

(10) Patent No.: US 12,752,643 B2
(45) Date of Patent: Oct. 6, 2026

(54) FUEL CELL SYSTEM AND FUEL CELL VEHICLE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Naoya Tomimoto, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 18/276,405

(22) PCT Filed: Feb. 10, 2022

(86) PCT No.: PCT/JP2022/005358
§ 371 (c)(1),
(2) Date: Aug. 8, 2023

(87) PCT Pub. No.: WO2022/172992
PCT Pub. Date: Aug. 18, 2022

(65) Prior Publication Data

US 2024/0123841 A1 Apr. 18, 2024

(30) Foreign Application Priority Data

Feb. 12, 2021 (JP) ................................ 2021-021279
Mar. 24, 2021 (JP) ................................ 2021-049545
Apr. 7, 2021 (JP) ................................ 2021-065055

(51) Int. Cl.
*B60L 50/75* (2019.01)
*B60L 1/00* (2006.01)
(Continued)

(52) U.S. Cl.
CPC ................. *B60L 50/75* (2019.02); *B60L 1/00* (2013.01); *B60L 50/72* (2019.02); *B60L 58/12* (2019.02);
(Continued)

(58) Field of Classification Search
CPC .. B60L 50/75; B60L 1/00; B60L 50/72; B60L 58/12; B60L 58/40; B60L 7/14;
(Continued)

(56) References Cited

U.S. PATENT DOCUMENTS 8,795,861 B2 * 8/2014 Kazuno .................. B60L 58/20 429/430
10,358,050 B2 7/2019 Tomimoto
(Continued)

FOREIGN PATENT DOCUMENTS

JP 06-305311 A 11/1994
JP 11-008909 A 1/1999
(Continued)

OTHER PUBLICATIONS

International Search Report for PCT/JP2022/005358 dated Mar. 29, 2022 [PCT/ISA/210].

*Primary Examiner* — Kurt Philip Liethen
(74) *Attorney, Agent, or Firm* — Sughrue Mion, PLLC

(57) ABSTRACT

A controller for a fuel cell system controls generated power of a fuel cell stack by switching a generation state of the fuel cell stack based on a state of charge of a power storage device. The generation state includes a first generation state, in which the fuel cell stack is caused to generate a first generated power, a second generation state, in which the fuel cell stack is caused to generate a second generated power greater than the first generated power, and a third generation state, in which the fuel cell stack is caused to generate a third generated power greater than the second generated power.
(Continued)

The controller calculates a power reference value indicating an actual result of power generation of the fuel cell stack from the detected generated power of the fuel cell stack, and updates the second generated power based on the power reference value.

12 Claims, 10 Drawing Sheets

(51) Int. Cl.

| | |
|---|---|
| ***B60L 50/72*** | (2019.01) |
| ***B60L 58/12*** | (2019.01) |
| ***B60L 58/40*** | (2019.01) |
| ***H01M 8/04537*** | (2016.01) |
| ***H01M 8/04858*** | (2016.01) |
| ***H01M 8/04955*** | (2016.01) |

(52) U.S. Cl.
CPC ......... *B60L 58/40* (2019.02); *H01M 8/04537* (2013.01); *H01M 8/04858* (2013.01); *H01M 8/04955* (2013.01)

(58) Field of Classification Search
CPC ........ B60L 7/18; B60L 15/20; B60L 15/2018; B60L 50/40; B60L 50/51; B60L 2200/42; B60L 2200/44; B60L 2210/10; B60L 2210/40; B60L 2240/12; B60L 2240/16; B60L 2240/421; B60L 2240/642; B60L 2240/80; B60L 2250/26; B60L 2260/42; B60L 1/003; B60L 3/0046; B60L 58/15; H01M 8/04537; H01M 8/04858; H01M 8/04955; Y02E 60/50; Y02T 90/40
See application file for complete search history.

(56) References Cited

U.S. PATENT DOCUMENTS

| | | | | |
|---|---|---|---|---|
| 11,440,437 | B2 * | 9/2022 | Jung | B60L 58/31 |
| 11,804,614 | B2 * | 10/2023 | Sakai | H01M 8/0432 |
| 12,296,697 | B2 * | 5/2025 | Hong | B60L 58/40 |
| 2009/0029197 | A1 | 1/2009 | Hibino et al. | |
| 2011/0137501 | A1 * | 6/2011 | Lee | B60L 58/34 701/22 |
| 2011/0246013 | A1 * | 10/2011 | Yee | B60W 10/26 180/65.265 |
| 2018/0126868 | A1 | 5/2018 | Tomimoto | |
| 2019/0255969 | A1 | 8/2019 | Takamoto et al. | |
| 2020/0295392 | A1 | 9/2020 | Bono et al. | |
| 2021/0313605 | A1 * | 10/2021 | Lee | B60L 50/72 |
| 2021/0387545 | A1 * | 12/2021 | Lee | B60L 58/40 |
| 2022/0166036 | A1 * | 5/2022 | Tanimoto | B60L 58/30 |
| 2024/0282990 | A1 * | 8/2024 | Hasegawa | B60L 58/40 |

FOREIGN PATENT DOCUMENTS

| | | | |
|---|---|---|---|
| JP | 2005-322454 | A | 11/2005 |
| JP | 2006-278046 | A | 10/2006 |
| JP | 2009-165210 | A | 7/2009 |
| JP | 2009-298348 | A | 12/2009 |
| JP | 2012-239311 | A | 12/2012 |
| JP | 2015-144503 | A | 8/2015 |
| JP | 2015-211527 | A | 11/2015 |
| JP | 2016-015814 | A | 1/2016 |
| JP | 2018-073722 | A | 5/2018 |
| JP | 2019-087479 | A | 6/2019 |
| JP | 6526614 | B2 | 6/2019 |
| JP | 2019-125461 | A | 7/2019 |
| JP | 2020-149882 | A | 9/2020 |
| JP | 6765936 | B2 | 10/2020 |
| WO | 2006/136934 | A1 | 12/2006 |

* cited by examiner

FUEL CELL SYSTEM AND FUEL CELL VEHICLE

CROSS REFERENCE TO RELATED APPLICATIONS

This application is a National Stage of International Application No. PCT/JP2022/005358 filed Feb. 10, 2022, claiming priority based on Japanese Patent Application No. 2021-021279 filed Feb. 12, 2021, Japanese Patent Application No. 2021-049545, filed Mar. 24, 2021, and Japanese Patent Application No. 2021-065055 filed Apr. 7, 2021.

TECHNICAL FIELD

The present disclosure relates to a fuel cell system and a fuel cell electric vehicle.

BACKGROUND ART

A typical fuel cell system includes a fuel cell stack, a power storage device, and a controller. The fuel cell stack supplies power to a load. The power storage device is charged with surplus power when surplus power is generated in the fuel cell stack. When the power generated by the fuel cell stack is insufficient, the power storage device discharges power corresponding to the power shortage. The power storage device also has a function of charging regenerative power output from the load. The controller controls operation of the fuel cell system including the generation state of the fuel cell stack, in accordance with various parameters such as the requested power of the load and the charging rate of the power storage device.

Patent Literature 1 discloses that a generation state of a fuel cell stack is changed such that power generated by the fuel cell stack changes stepwise in accordance with a charging rate of a power storage device.

Patent Literature 2 discloses that, when there is a possibility that a power storage device may be overcharged with regenerative power, an auxiliary device (load) involved in power generation of a fuel cell stack is driven so that power supplied from the fuel cell stack is consumed.

Patent Literature 3 discloses that, when a current flowing from a fuel cell stack to a load remains greater than or equal to a specified current for a specified time or longer, the generated power of the fuel cell stack is increased from the current generated power.

CITATION LIST

Patent Literature

Patent Literature 1: Japanese Laid-Open Patent Publication No. 2018-73722
Patent Literature 2: Japanese Laid-Open Patent Publication No. 2015-144503
Patent Literature 3: Japanese Patent No. 6765936

SUMMARY OF INVENTION

Technical Problem

In Patent Literature 1, when the generation state of the fuel cell stack is changed, the power generated by the fuel cell stack fluctuates, which causes deterioration of the fuel cell.

In Patent Literature 2, when the auxiliary device directly involved in power generation of the fuel cell stack is forcibly driven to prevent the power storage device from being overcharged, the output of the fuel cell stack may have a high potential, and the fuel cell stack may deteriorate.

In Patent Literature 3, the power storage device may be over-discharged during a period from when the current flowing from the fuel cell stack to the load becomes greater than or equal to the specified current to when that state has continued for the specified time. The over-discharge of the power storage device causes deterioration of the power storage device.

Accordingly, it is necessary to properly control the fuel cell system to limit deterioration of the fuel cell system, which includes the fuel cell stack and the power storage device.

Solution to Problem

In a first aspect of the present disclosure, a fuel cell system includes a fuel cell stack configured to supply power to a load, a power storage device connected in parallel with the load, a state-of-charge detecting unit configured to detect a state of charge of the power storage device, a generated power detecting unit configured to detect generated power of the fuel cell stack, and a controller configured to control the generated power of the fuel cell stack by switching a generation state of the fuel cell stack based on the state of charge of the power storage device detected by the state-of-charge detecting unit. The generation state includes a first generation state, a second generation state, and a third generation state. In the first generation state, the fuel cell stack is caused to generate a first generated power. In the second generation state, the fuel cell stack is caused to generate a second generated power. The second generated power is greater than the first generated power. In the third generation state, the fuel cell stack is caused to generate a third generated power. The third generated power is greater than the second generated power. The controller includes a power reference value calculating unit configured to calculate a power reference value indicating an actual result of power generation of the fuel cell stack from the generated power detected by the generated power detecting unit, and an updating unit configured to update the second generated power based on the power reference value.

In a second aspect of the present disclosure, a fuel cell system mounted on a fuel cell electric vehicle includes a fuel cell stack, a power storage device connected to a power line between the fuel cell stack and a load mounted on the fuel cell electric vehicle, auxiliary devices configured to be driven by power supplied from the fuel cell stack, and a controller configured to control power generation of the fuel cell stack and operation of the auxiliary devices. The auxiliary devices include a first auxiliary device that is directly involved in power generation of the fuel cell stack, and a second auxiliary device that is not directly involved in power generation of the fuel cell stack. The controller is configured to stop power generation of the fuel cell stack and drive the second auxiliary device when a regenerative power supplied from the fuel cell electric vehicle to the fuel cell system is greater than or equal to a specified power and acceleration of the fuel cell electric vehicle is less than or equal to a specified acceleration.

In a third aspect of the present disclosure, a fuel cell electric vehicle includes a fuel cell stack, a load, a power storage device connected to a power line between the fuel cell stack and the load, and a travel controlling unit configured to control travel of the fuel cell electric vehicle. The travel controlling unit is configured to determine that the fuel cell electric vehicle is traveling uphill based on a requested power that the fuel cell electric vehicle requests from the power storage device, a speed of the fuel cell electric vehicle, an accelerator operation amount of the fuel cell electric vehicle, and an acceleration of the fuel cell electric vehicle. The travel controlling unit is also configured to increase a generated power of the fuel cell stack from the current generated power when determining that the fuel cell electric vehicle is traveling uphill.

In a fourth aspect of the present disclosure, a fuel cell system mounted on a fuel cell electric vehicle includes a fuel cell stack, a power storage device connected to a power line between the fuel cell stack and a load mounted on the fuel cell electric vehicle, and a controller configured to control power generation of the fuel cell stack. The controller is configured to determine that the fuel cell electric vehicle is traveling uphill based on a requested power that the fuel cell electric vehicle requests from the power storage device, a speed of the fuel cell electric vehicle, an accelerator operation amount of the fuel cell electric vehicle, and an acceleration of the fuel cell electric vehicle. The controller is also configured to increase a generated power of the fuel cell stack from the current generated power when determining that the fuel cell electric vehicle is traveling uphill.

DESCRIPTION OF EMBODIMENTS

First Embodiment

A fuel cell system according to a first embodiment will now be described.

Figure 1:
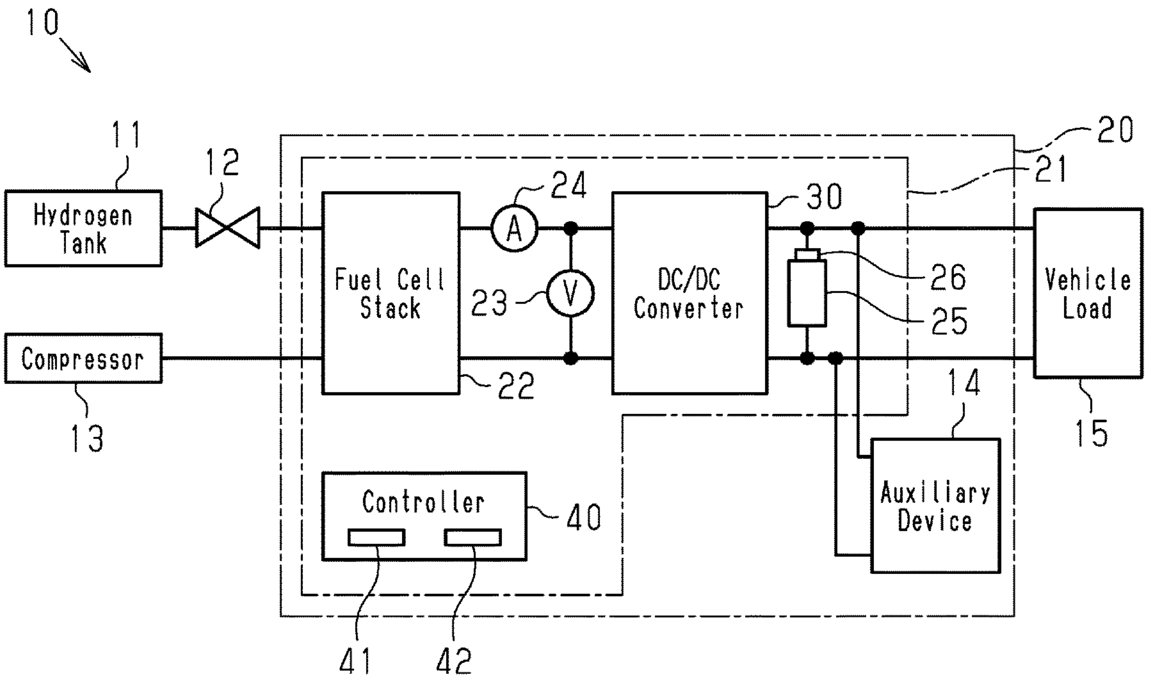
FIG. 1 is a schematic diagram of a fuel cell electric vehicle including a fuel cell system according to a first embodiment.

As shown in FIG. 1, a fuel cell electric vehicle 10 includes a hydrogen tank 11, a valve 12, a compressor 13, a vehicle load 15, and a fuel cell unit 20. The fuel cell electric vehicle 10 may be a passenger car or may be an industrial vehicle. In one example, the fuel cell electric vehicle 10 is an industrial vehicle. Industrial vehicles include, for example, forklifts and towing tractors. Alternatively, the hydrogen tank 11, the valve 12, the compressor 13, and the fuel cell unit 20 may constitute a stationary generator that supplies power to a connected load.

The fuel cell unit 20 includes an auxiliary device 14 and a fuel cell system 21. The fuel cell system 21 includes a fuel cell stack 22, a voltage sensor 23, a current sensor 24, a DC/DC converter 30, a power storage device 25, a state-of-charge detecting unit 26, and a controller 40.

The hydrogen tank 11 stores hydrogen gas. Hydrogen gas discharged from the hydrogen tank 11 is supplied to the fuel cell stack 22.

The valve 12 is a member for adjusting the supply amount of hydrogen gas supplied from the hydrogen tank 11 to the fuel cell stack 22. The valve 12 is an electromagnetically driven on-off valve in which a valve member is electromagnetically driven in accordance with a drive cycle and/or a valve opening time. The amount of hydrogen gas supplied to the fuel cell stack 22 can be adjusted by controlling the drive cycle and/or the valve opening time of the valve 12.

The compressor 13 is a motor-driven compressor, which is driven by an electric motor. The compressor 13 supplies air to the fuel cell stack 22. The amount of air supplied to the fuel cell stack 22 can be adjusted by controlling the rotation speed of the electric motor through control of the voltage applied to the electric motor.

The fuel cell stack 22 is includes multiple fuel cells connected to each other in series. The fuel cells are, for example, polymer electrolyte fuel cells. The fuel cell stack 22 generates power through electrochemical reaction of fuel gas and oxidant gas. In one example, power generation is performed using hydrogen gas as a fuel gas and oxygen in the air as an oxidant gas. The fuel cell stack 22 generates power using hydrogen gas supplied from the hydrogen tank 11 and oxygen supplied from the compressor 13.

The voltage sensor 23 measures the voltage of the fuel cell stack 22. The measurement result of the voltage sensor 23 is obtained by the controller 40.

The current sensor 24 measures the current of the fuel cell stack 22. The measurement result of the current sensor 24 is obtained by the controller 40.

The DC/DC converter 30 is connected to the fuel cell stack 22. The DC/DC converter 30 increases the voltage of the DC power generated by the fuel cell stack 22 and outputs the power.

Figure 2:
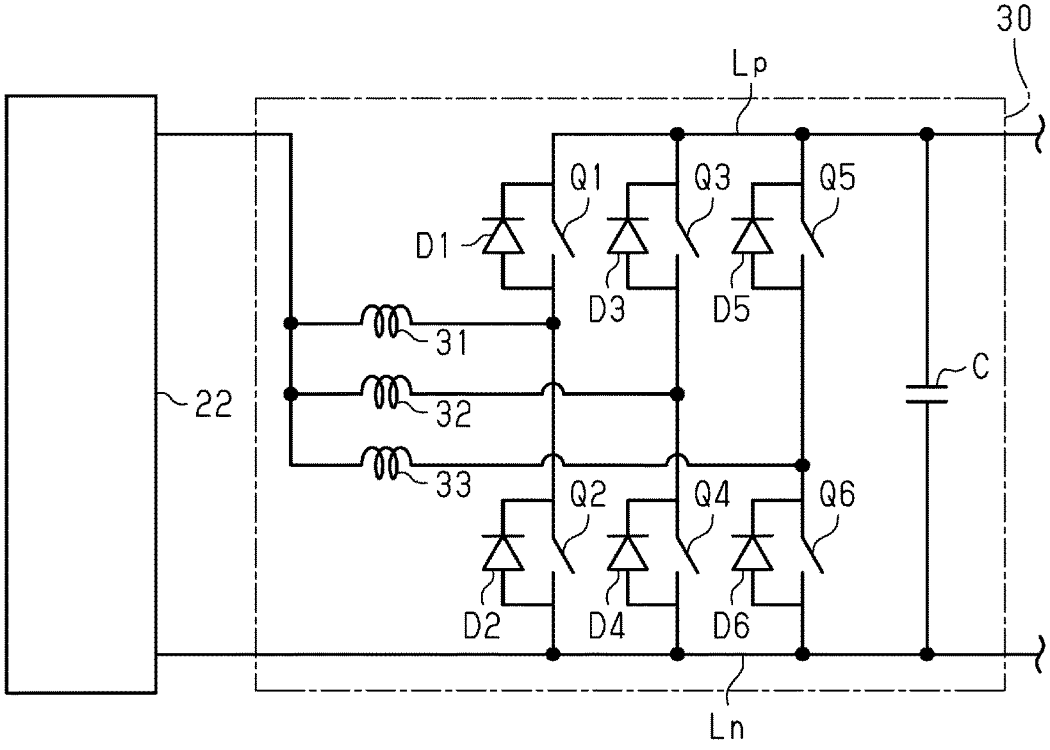
FIG. 2 is a circuit diagram of a DC/DC converter.

As shown in FIG. 2, the DC-DC converter 30 includes a positive electrode line Lp, a negative electrode line Ln, six switching elements Q1, Q2, Q3, Q4, Q5, Q6, six diodes D1, D2, D3, D4, D5, D6, three reactors 31, 32, 33, and a capacitor C.

The first switching element Q1 and the second switching element Q2 are connected to each other in series. The third switching element Q3 and the fourth switching element Q4 are connected to each other in series. The fifth switching element Q5 and the sixth switching element Q6 are connected to each other in series. The first switching element Q1, the third switching element Q3, and the fifth switching element Q5 are connected to the positive electrode line Lp. The second switching element Q2, the fourth switching element Q4, and the sixth switching element Q6 are connected to the negative electrode line Ln. The first switching element Q1, the third switching element Q3, and the fifth switching element Q5 form an upper arm. The second switching element Q2, the fourth switching element Q4, and the sixth switching element Q6 form a lower arm. For example, metal oxide semiconductor field effect transistors (MOSFETs) are used as the switching elements Q1 to Q6. Insulated gate bipolar transistors (IGBTs) may be used as the switching elements Q1 to Q6.

The diodes D1 to D6 are each connected in parallel to the corresponding one of the switching elements Q1 to Q6. The diodes D1 to D6 are parasitic diodes of the corresponding switching elements Q1 to Q6. The cathodes of the diodes D1, D3, D5, which are connected in parallel to the switching elements Q1, Q3, Q5 forming the upper arm are connected to the positive electrode line Lp. The anodes of the diodes D1, D3, D5, which are connected in parallel to the switching elements Q1, Q3, Q5 forming the upper arm are each connected to a midpoint between the corresponding two of the switching elements Q1 to Q6 connected to each other in series. The cathodes of the diodes D2, D4, D6, which are connected in parallel to the switching elements Q2, Q4, Q6 forming the lower arm are each connected to a midpoint between the corresponding two of the switching elements Q1 to Q6 connected to each other in series. The anodes of the diodes D2, D4, D6, which are connected in parallel to the switching elements Q2, Q4, Q6 forming the lower arm are connected to the negative electrode line Lp.

The reactors 31, 32, 33 are each connected to each of midpoint between corresponding one of the switching elements Q1, Q3, Q5, forming the upper arm, and corresponding one of the switching elements Q2, Q4, Q6, forming the lower arm. The reactors 31, 32, 33 are connected to the fuel cell stack 22.

The capacitor C is connected to the positive electrode line Lp and the negative electrode line Ln.

In the above-described DC-DC converter 30, a voltage increase is performed by the switching operation of the switching elements Q1 to Q6. The DC/DC converter 30 outputs, for example, a DC voltage in the voltage range of the power storage device 25.

As shown in FIG. 1, the auxiliary device 14 is connected to the DC/DC converter 30. The auxiliary device 14 is an electrical component included in the fuel cell unit 20 and driven by the power generated by the fuel cell stack 22.

The vehicle load 15 is connected to the DC/DC converter 30. The vehicle load 15 includes, among electrical components mounted on the fuel cell electric vehicle 10, electrical components other than the auxiliary device 14 that are driven by the power generated by the fuel cell stack 22. The vehicle load 15 includes a traveling motor, which causes the fuel cell electric vehicle 10 to travel, and an inverter that drives the traveling motor. When the fuel cell electric vehicle 10 is an industrial vehicle, the vehicle load 15 may further include a cargo handling motor and an inverter that drives the cargo handling motor. The vehicle load 15 is capable of supplying regenerative power generated by a motor or the like to the fuel cell system 21. The auxiliary device 14 and the vehicle load 15 are loads. The fuel cell stack 22 supplies power to the loads via the DC/DC converter 30. In the following description, the auxiliary device 14 and the vehicle load 15 are collectively referred to as the loads in some cases.

The power storage device 25 is connected to a power line between the fuel cell stack 22 and the loads. The power storage device 25 is also connected in parallel with the loads. Any device that can be charged and discharged can be used as the power storage device 25. Examples of the power storage device 25 include a rechargeable battery and a capacitor such as a lithium ion capacitor. In general, a capacitor has a relatively small capacitance and excellent charge-discharge characteristics. Using a capacitor as the power storage device 25, the charge-discharge characteristics of the fuel cell system 21 are relatively high. When the generated power of the fuel cell stack 22 exceeds the power requested by the loads, surplus power is used to charge the power storage device 25. When the generated power of the fuel cell stack 22 falls below the power requested by the loads, the power corresponding to the insufficiency is discharged from the power storage device 25. The generated power of the fuel cell stack 22 is also referred to as output power of the fuel cell stack 22.

The state-of-charge detecting unit 26 detects a state of charge of the power storage device 25. Examples of the state of charge include the charging rate of the power storage device 25, the remaining power of the power storage device 25, and the open-circuit voltage of the power storage device 25. In one example, the state-of-charge detecting unit 26 detects the charging rate of the power storage device 25. The state-of-charge detecting unit 26 includes a sensor and an estimating unit that estimates a state of charge from a detection result of the sensor. The sensor includes at least one of a current sensor and a voltage sensor. The estimating unit estimates the charging rate of the power storage device 25 by a current integration method of integrating a charge-discharge current of the power storage device 25, a method of using a correlation between an open-circuit voltage of the power storage device 25 and the charging rate of the power storage device 25, or a combination thereof. The open-circuit voltage may be estimated from the closed-circuit voltage.

The controller 40 includes a processor 41 and a storage unit 42. The processor 41 is a control unit that includes a microcomputer. The processor 41 may be, for example, a central processing unit (CPU), a graphics processing unit (GPU), or a digital signal processor (DSP). The storage unit 42 includes a random access memory (RAM), a read only memory (ROM), and a nonvolatile memory that can be rewritten. The nonvolatile memory includes, for example, an electrically erasable programmable read-only memory (EEPROM), and a flash memory. The storage unit 42 stores program codes or instructions configured to cause the processor to execute processes. The storage unit 42, which is a computer-readable medium, includes any type of medium that is accessible by a general-purpose computer or a dedicated computer. The controller 40 may include a hardware circuit such as an application specific integrated circuit (ASIC) and a field programmable gate array (FPGA). The controller 40, which is processing circuitry, may include one or more processors that operate according to a computer program, one or more hardware circuits such as an ASIC and an FPGA, or a combination thereof.

The controller 40 controls the generated power of the fuel cell stack 22. The generated power of the fuel cell stack 22 varies depending on the amount of hydrogen gas supplied to the fuel cell stack 22 and the amount of oxygen supplied to the fuel cell stack 22. The controller 40 controls the amount of hydrogen gas supplied to the fuel cell stack 22 by controlling the valve 12. The controller 40 controls the amount of oxygen supplied to the fuel cell stack 22 by controlling the compressor 13.

The controller 40 controls the DC/DC converter 30. The controller 40 controls the switching elements Q1 to Q6 so that power corresponding to the requested power of the loads is output from the fuel cell stack 22. During power generation of the fuel cell stack 22, the voltage of the fuel cell stack 22 falls below the voltage of the power storage device 25. In one example, the voltage of the fuel cell stack 22 exceeds the voltage of the power storage device 25 when the fuel cell stack 22 is not generating power. During power generation of the fuel cell stack 22, the controller 40 causes the switching elements Q1 to Q6 to perform switching, thereby performing a voltage increase. The controller 40 does not perform the switching operation of the switching elements Q1 to Q6 when the power generation of the fuel cell stack 22 is stopped. In this case, a current flows from the diodes D1, D3, D5, which serve as parasitic diodes of the switching elements Q1, Q3, Q5, forming the upper arm, to the power storage device 25. The power storage device 25 can be charged while the voltage of the fuel cell stack 22 is lowered by the diodes D1, D3, D5.

Figure 3:
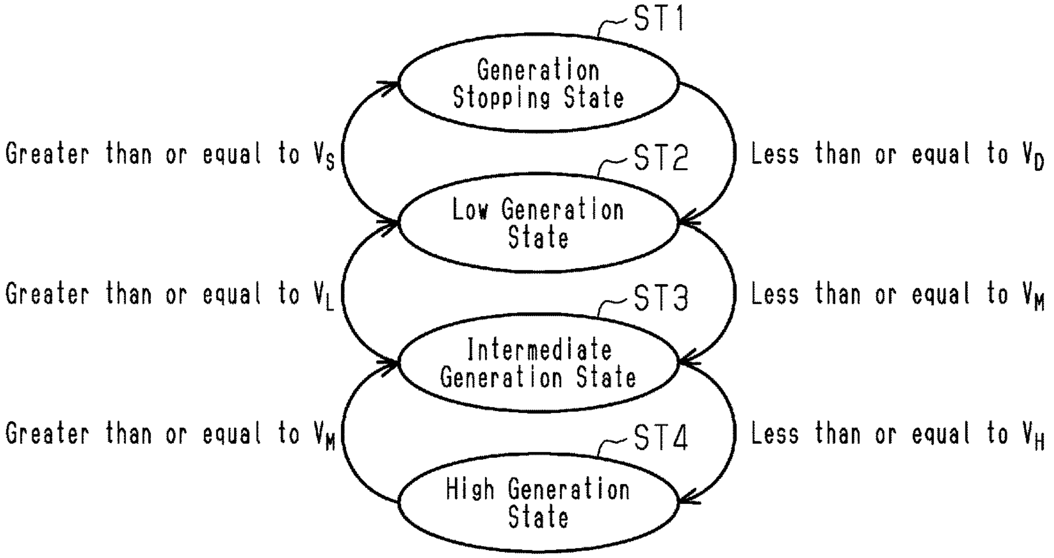
FIG. 3 is a state transition diagram of a generation state.

As shown in FIG. 3, the controller 40 switches the generation state of the fuel cell stack 22 stepwise in accordance with the charging rate of the power storage device 25. In one example, the generation state of the fuel cell stack 22 includes a generation stopping state ST1, a low generation state ST2, an intermediate generation state ST3, and a high generation state ST4. The generation stopping state ST1, the low generation state ST2, the intermediate generation state ST3, and the high generation state ST4 are each associated with the generated power [kW] of the fuel cell stack 22. The controller 40 controls the generated power of the fuel cell stack 22 by switching the generation state. The generated power associated with the generation state is a target value of the generated power. The controller 40 performs a control such that the generated power of the fuel cell stack 22 approaches the target value.

The generation stopping state ST1 is a state in which the fuel cell stack 22 does not generate power. The generated power in the generation stopping state ST1 is 0 [kW].

The low generation state ST2 is a state in which the fuel cell stack 22 generates power. The generated power of the fuel cell stack 22 in the low generation state ST2 is referred to as a low generated power. The low generated power is, for example, 3 [kW]. The low generation state ST2 is a first generation state. The low generated power is a first generated power.

The intermediate generation state ST3 is a state in which the generated power of the fuel cell stack 22 is greater than that in the low generation state ST2. The generated power of the fuel cell stack 22 in the intermediate generation state ST3 is referred to as an intermediate generated power. The intermediate generated power is a variable value that changes in accordance with the usage state of the fuel cell stack 22. The intermediate generation state ST3 is a second generation state. The intermediate generated power is a second generated power.

The high generation state ST4 is a state in which the fuel cell stack 22 is caused to generate power requested by the loads when the fuel cell electric vehicle 10 operates at the maximum load. The generated power of the fuel cell stack 22 in the high generation state ST4 is referred to as a high generated power. The high generated power is, for example, 12 [kW]. The high generation state ST4 is a third generation state. The high generated power is a third generated power.

When the charging rate of the power storage device 25 becomes less than or equal to a generation start threshold $V_D$ while the fuel cell stack 22 is in the generation stopping state ST1, the controller 40 shifts the fuel cell stack 22 to the low generation state ST2. The generation start threshold $V_D$ is, for example, 50 [%].

When the charging rate of the power storage device 25 becomes less than or equal to an intermediate generation switching threshold $V_M$ while the fuel cell stack 22 is in the low generation state ST2, the controller 40 shifts the fuel cell stack 22 to the intermediate generation state ST3. The intermediate generation switching threshold $V_M$ is, for example, 45[%].

When the charging rate of the power storage device 25 becomes less than or equal to a high generation switching threshold $V_D$ while the fuel cell stack 22 is in the intermediate generation state ST3, the controller 40 shifts the fuel cell stack 22 to the high generation state ST4. The high generation switching threshold $V_D$ is, for example, 30 [%].

When the charging rate of the power storage device 25 becomes greater than or equal to an intermediate generation switching threshold $V_M$ while the fuel cell stack 22 is in the high generation state ST4, the controller 40 shifts the fuel cell stack 22 to the intermediate generation state ST3.

When the charging rate of the power storage device 25 becomes greater than or equal to a low generation switching threshold $V_L$ while the fuel cell stack 22 is in the intermediate generation state ST3, the controller 40 shifts the fuel cell stack 22 to the low generation state ST2. The low generation switching threshold $V_L$ is, for example, 60 [%].

When the charging rate of the power storage device 25 becomes greater than or equal to a generation stopping threshold $V_S$ while the fuel cell stack 22 is in the low generation state ST2, the controller 40 shifts the fuel cell stack 22 to the generation stopping state ST1. The generation stopping threshold $V_S$ is, for example, 70 [%].

The controller 40 performs an intermediate generated power setting process. The intermediate generated power setting process is a process for setting the intermediate generated power. The intermediate generated power setting process is repeatedly performed at a predetermined control cycle while the fuel cell electric vehicle 10 is in an activated state. The activated state refers to a state in which the fuel cell electric vehicle 10 can travel. The activation state is also referred to as a key-ON state.

Figure 4:
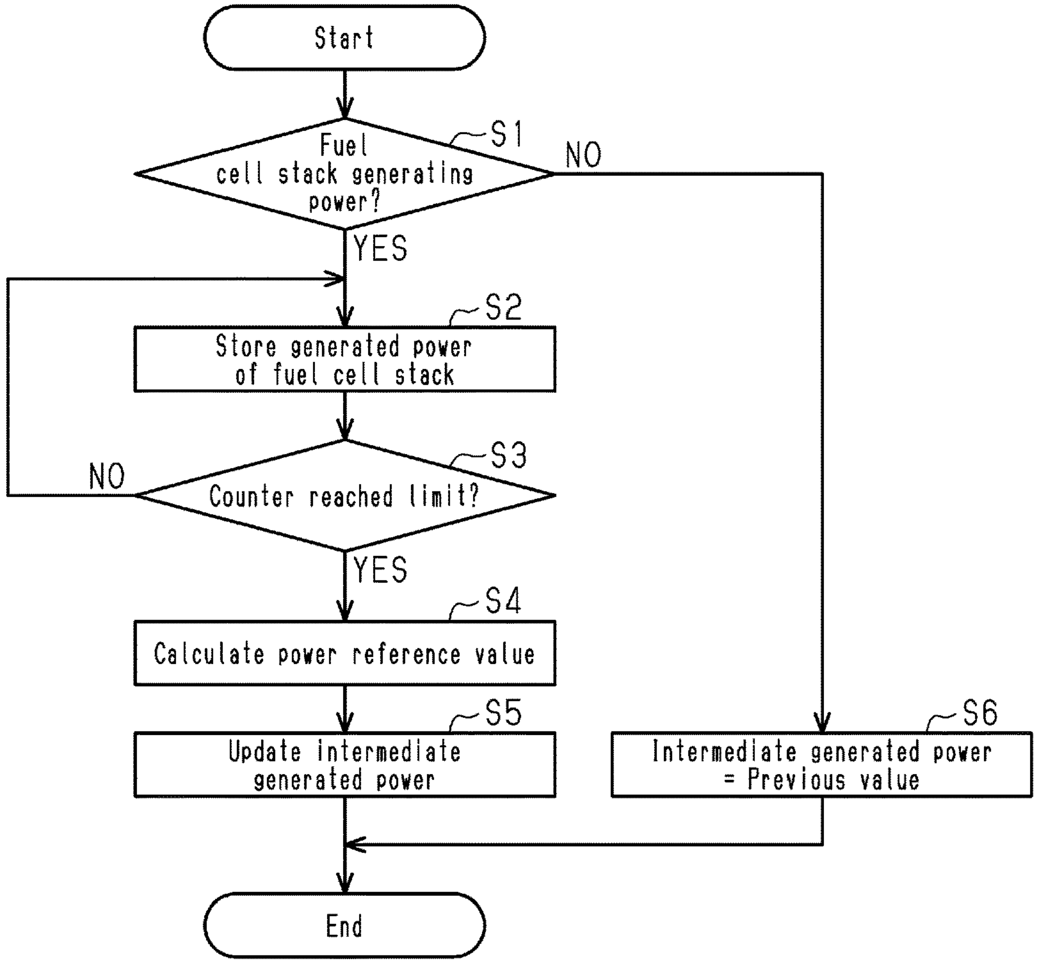
FIG. 4 is a flowchart showing an intermediate generated power setting process.

As shown in FIG. 4, at step S1, the controller 40 determines whether the fuel cell stack 22 is generating power. Whether the fuel cell stack 22 is generating power can be determined from the generation state of the fuel cell stack 22. If the fuel cell stack 22 is in the generation stopping state ST1, the controller 40 determines that the fuel cell stack 22 is not generating power. If the fuel cell stack 22 is in the low generation state ST2, the intermediate generation state ST3, or the high generation state ST4, the controller 40 determines that the fuel cell stack 22 is generating power. When the determination result of step S1 is affirmative, the controller 40 executes the process of step S2. When the determination result of step S1 is negative, the controller 40 executes the process of step S6.

In step S2, the controller 40 stores the value of the generated power of the fuel cell stack 22 in the storage unit 42. Specifically, the controller 40 calculates the generated power of the fuel cell stack 22 from the detection result of the current sensor 24 and the detection result of the voltage sensor 23. Then, the controller 40 stores the value of the generated power in the storage unit 42. The current sensor 24 and the voltage sensor 23 correspond to a generated power detecting unit that detects the generated power of the fuel cell stack 22.

Next, in step S3, the controller 40 determines whether a counter has reached its limit. The controller 40 counts the number of times the process of step S2 has been executed. When the number of times the process of step S2 has been executed reaches a preset number of times, the controller 40 determines that the counter has reached its limit. That is, the controller 40 determines that the counter has reached its limit when the number of times the value of the generated power of the fuel cell stack 22 is stored in the storage unit 42 reaches a predetermined number of times. When the determination result of step S3 is negative, the controller 40 returns to the process of step S2. When the determination result of step S3 is affirmative, the controller 40 executes the process of step S4. In this manner, the controller 40 executes the process of step S2 until the counter reaches its limit.

Next, in step S4, the controller 40 calculates a power reference value [kW]. The power reference value is a value indicating an actual result of power generation of the fuel cell stack 22. In one example, an average value of the generated power of the fuel cell stack 22 is employed as the power reference value. The controller 40 calculates the average value of the generated power of the fuel cell stack 22 stored in the storage unit 42 by the processes of step S2 and step S3. The controller 40 sets the power reference value to the average value. The controller 40 executing the process of step S4 functions as a power reference value calculating unit.

Next, in step S5, the controller 40 updates the intermediate generated power. The controller 40 obtains the difference between the power reference value and an initial value, and divides the difference by a specified time [h], which has been determined in advance. The specified time is also referred to as a reference time. The controller 40 adds the value obtained by the division to the initial value to calculate the intermediate generated power. That is, the controller 40 calculates the intermediate generated power using the following expression (1).

$$\text{Intermediate generated power} = \text{Initial value} + (\text{Power reference value} - \text{Initial value}) / \text{Specified time} \quad (1)$$

The initial value is a set value, which is determined in advance, when the process of step S5 is executed for the first time. When the process of step S5 is executed for the first time, the intermediate generated power has not been updated. The set value can be set to any value in a range of the low generated power to the high generated power. In the second and subsequent executions of the process of step S5, the initial value is the value of the intermediate generated power calculated in the previous control cycle. That is, the initial value is the current value of the intermediate generated power.

Any value can be used as the specified time. The specified time is set, for example, to a value that allows the calculation of the intermediate generated power in accordance with the usage state of the load over a period of one week. For example, when it is assumed that the fuel cell electric vehicle 10 operates for five days in one week, eight hours per day, the specified time is 40 [h].

As can be understood from the expression (1), the intermediate generated power gradually approaches the average value of the power reference value obtained during the specified time as the time during which the fuel cell stack 22 is generating power elapses. That is, the intermediate generated power can be regarded as an average value of the generated power of the fuel cell stack 22 during the latest specified time. The controller 40 sets the new intermediate generated power to the value calculated by the expression (1), and ends the intermediate generated power setting process. The controller 40 executing the process of step S5 functions as an updating unit. The intermediate generated power is set in a range of the low generated power to the high generated power. The intermediate generated power is thus greater than the low generated power and less than the high generated power.

In step S6, the controller 40 defines the intermediate generated power as a previous value. That is, the controller 40 maintains the intermediate generated power calculated in the previous control cycle.

The value of the intermediate generated power is stored in a nonvolatile memory of the storage unit 42 to be held even when the fuel cell electric vehicle 10 is brought into the key-OFF state.

Operation of the first embodiment will now be described.

The usage state of the fuel cell stack 22 changes in accordance with the usage state of the fuel cell electric vehicle 10. The usage state of the fuel cell stack 22 varies from customer to customer. For example, the usage state of the fuel cell stack 22 varies depending on factors such as a difference in a method of operating the fuel cell electric vehicle 10 by an operator of the fuel cell electric vehicle 10, an environment in which the fuel cell electric vehicle 10 is used, presence or absence of a busy period, and a time of the busy period. In other words, the appropriate intermediate generated power differs for each customer. The appropriate intermediate generated power is power with which transition from the intermediate generation state ST3 to a generation state different from the intermediate generation state ST3 is reduced.

In the first embodiment, the intermediate generated power is updated based on the power reference value, which indicates the actual result of power generation of the fuel cell stack 22. Accordingly, the intermediate generated power is set in accordance with the usage state of the fuel cell stack 22. The generated power of the fuel cell stack 22 is thus prevented from being insufficient or excessive. If the intermediate generated power is a constant value of 5 [kW] and the load needs power of 4 [kW] on average, the power storage device 25 is charged with power of 1 [kW]. When the charging rate of the power storage device 25 increases, the middle generation state ST3 transitions to the low generation state ST2. If the intermediate generated power is a constant value of 5 [kW] and the load needs power of 6 [kW] on average, the power storage device 25 discharges power of 1 [kW]. When the charging rate of the power storage device 25 decreases, the middle generation state ST3 transitions to the high generation state ST4. In contrast, if the intermediate generated power is set based on the power reference value, charging and discharging of the power storage device 25 can be suppressed as compared with the case in which the intermediate generated power is set to a constant value. Since the generation state of the fuel cell stack 22 transitions in accordance with the charging rate of the power storage device 25, the number of transitions of the generation state can be reduced by reducing fluctuations in the charging rate of the power storage device 25.

Figure 5:
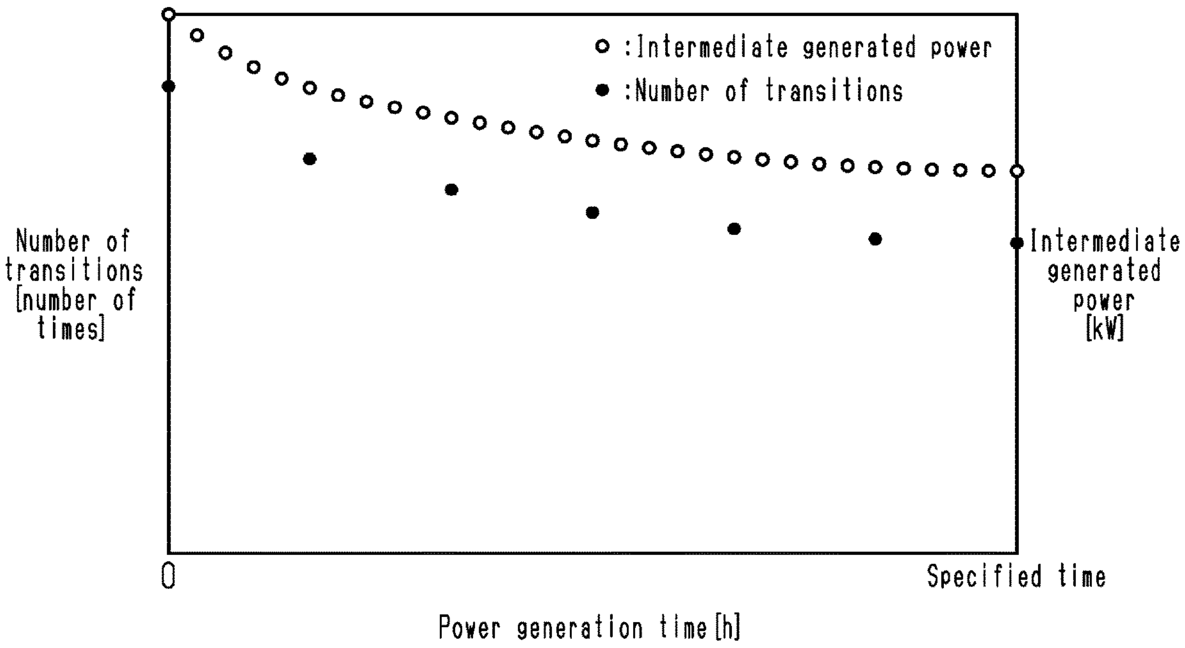
FIG. 5 is a diagram showing an example of the relationship between values of intermediate generated power and the number of transitions of the generation state of a fuel cell stack in relation to a power generation time of the fuel cell stack.

FIG. 5 shows an example of a relationship between the number of transitions of the generation state of the fuel cell stack 22 and the intermediate generated power with the power generation time during which the fuel cell stack 22 performs power generation. In the example shown in FIG. 5, the time at which the initial value of the expression (1) is the set value, that is, the time at which the actual result of power generation of the fuel cell stack 22 is not reflected in the intermediate generated power is set to 0. As can be understood from FIG. 5, the intermediate generated power is updated each time the time during which the fuel cell stack 22 performs power generation elapses. Each time the time during which the fuel cell stack 22 performs power generation elapses, the actual result of power generation of the fuel cell stack 22 is accumulated, and the intermediate generated power that reflects the tendency according to the usage state of the load is set. When the specified time elapses, the intermediate generated power sufficiently reflecting the usage state of the load is set. As the intermediate generated power is updated, the number of transitions of the generation state of the fuel cell stack 22 also decreases.

The fuel cell stack 22 has a characteristic that the current increases as the generated power increases, and the voltage decreases as the generated power increases. The theoretical voltage of the fuel cell stack 22 is 1.23 [V], and the loss in the fuel cell stack 22 increases as the voltage of the fuel cell stack 22 deviates from the theoretical voltage. The theoretical voltage is a voltage obtained when all the chemical energy of hydrogen gas is converted into electrical energy. When the generated power of the fuel cell stack 22 increases and the voltage of the fuel cell stack 22 decreases, the difference between the voltage of the fuel cell stack 22 and the theoretical voltage increases, and the loss in the fuel cell stack 22 increases. In the example shown in FIG. 5, the intermediate generated power gradually decreases. In this manner, since the intermediate generated power is set based on the actual result of power generation of the fuel cell stack 22, the generated power of the fuel cell stack 22 is prevented from being excessively high. This reduces the loss in the fuel cell stack 22.

The first embodiment has the following advantages.

(1) The intermediate generated power is set based on the power reference value. Since the change in the charging rate of the power storage device 25 is small, the fuel cell stack 22 is unlikely to transition from the intermediate generation state ST3 to the low generation state ST2 or from the intermediate generation state ST3 to the high generation state ST4. The fluctuations of the generated power of the fuel cell stack 22 due to the transition of the generation state are suppressed, and deterioration of the fuel cell stack 22 is reduced.

(2) The controller 40 obtains the difference between the power reference value and the initial value, and divides the difference by the specified time, which has been determined in advance. The controller 40 adds the obtained value to the initial value to calculate a new intermediate generated power. The intermediate generated power gradually decreases or gradually increases in accordance with the actual result of power generation of the fuel cell stack 22. Even when the generated power of the fuel cell stack 22 temporarily becomes excessively large or temporarily becomes excessively small, it is possible to calculate the intermediate generated power in accordance with the actual result of power generation while suppressing the influence of the temporary increase or the temporary decrease.

In addition, the amount of data stored in the storage unit 42 is less than that in a case in which the generated power of the fuel cell stack 22 obtained during the specified time is stored in the storage unit 42, and the average value of the generated power obtained during the specified time is calculated as the intermediate generated power. This prevents the capacity of the storage unit 42 from increasing.

(3) Since the generation state of the fuel cell stack 22 is unlikely to transition from the intermediate generation state ST3, the generated power of the fuel cell stack 22 is unlikely to fluctuate. When the generated power of the fuel cell stack 22 is allowed to fluctuate, it is necessary to control the compressor 13 and the valve 12 to adjust the supply amount of hydrogen gas and the supply amount of oxygen. At this time, the driving force of the compressor 13 and the drive cycle and/or the valve opening time of the valve 12 change. This causes a reduction in the quietness of the fuel cell electric vehicle 10. By making the generated power of the fuel cell stack 22 less likely to fluctuate, the quietness of the fuel cell electric vehicle 10 is improved.

The first embodiment may be modified as follows. The first embodiment and the following modifications can be combined if the combined modifications remain technically consistent with each other.

The controller 40 may control the value of the low generated power as a variable value. In this case, the value of the low generated power is changed in accordance with the value of the intermediate generated power. For example, the controller 40 may control the value of the low generated power to be half the value of the intermediate generated power. In addition, the controller 40 may set a lower limit value and an upper limit value for the value of the low generated power, and may change the value of the low generated power within the range of the lower limit value to the upper limit value. The lower limit value and the upper limit value may be any values. The lower limit value may be, for example, the lower limit of the voltage conversion limit value. The upper limit value may be, for example, the upper limit of the voltage conversion limit value.

The upper limit of the voltage conversion limit value is the generated power when the voltage of the fuel cell stack 22 is the lowest voltage that can be input to the DC/DC converter 30. The DC/DC converter 30 has a defined allowable range for the input voltage. By setting the upper limit of the voltage conversion limit value as described above, it is possible to prevent the voltage input to the DC/DC converter 30 from falling below the lower limit value of the allowable range.

The lower limit of the voltage conversion limit value is a voltage at which the voltage of the fuel cell stack 22 agrees with the voltage of the power storage device 25. When the voltage of the fuel cell stack 22 exceeds the voltage of the power storage device 25, voltage reduction is performed using the diodes D1, D3, D5. When voltage reduction is performed using the diodes D1, D3, D5, this voltage reduction causes a loss. By setting the lower limit of the voltage conversion limit value as described above, it is possible to prevent the voltage reduction by the diodes D1, D3, D5 from being performed. This reduces the loss due to the voltage reduction.

The controller 40 may set a lower limit value and an upper limit value for the value of the intermediate generated power. The lower limit value of the intermediate generated power and the upper limit value of the intermediate generated power may be set to any values. The lower limit of the voltage conversion limit value may be used as the lower limit value of the intermediate generated power, and the upper limit of the voltage conversion limit value may be used as the upper limit value of the voltage conversion limit value.

The intermediate generated power may be any value that corresponds to the electric power reference value, and may be calculated by a method different from the expression (1). For example, the intermediate generated power may be a moving average of the generated power in a specified time. The controller 40 obtains the power reference value at predetermined intervals and stores the power reference value in the storage unit 42. The controller 40 divides the total sum of the power reference values obtained during the specified time by the number of times the power reference value is obtained. The controller 40 may set the intermediate generated value to the value thus obtained.

The power reference value may be a median of the generated power of the fuel cell stack 22 stored in the storage unit 42 by the processes of step S2 and step S3. The controller 40 may obtain the generated power of the fuel cell stack 22 only once in one control cycle, and use the generated power as the power reference value. The power reference value may be a moving average of a generated power obtained during a specified period of time. That is, the power reference value may be any value if it is a value indicating the actual result of power generation of the fuel cell stack 22.

The generation state may include three states having different generated powers. For example, the low generation state ST2 of the first embodiment may be omitted, and the generation state may transition among three states: the generation stopping state ST1, the intermediate generation state ST3, and the high generation state ST4. In this case, the generation stopping state ST1 is the first generation state, the intermediate generation state ST3 is the second generation state, and the high generation state ST4 is the third generation state.

The generation state may include five or more states having different generated powers. In this case, the state corresponding to the average value of the generated power of the fuel cell stack 22 is the second generation state. A state in which the generated power is one step lower than that in the second generation state is the first generation state. A state in which the generated power is one stage higher than that in the second generation state is the third generation state.

The generated power of the fuel cell stack 22 may be calculated by dividing the power supplied to the vehicle load 15 by the value of (1−Ratio of auxiliary device loss). In this case, the current sensor 24 and the voltage sensor 23 are provided to measure the power supplied to the vehicle load 15. The auxiliary device loss includes the loss occurring in the DC/DC converter 30 and the power consumed by the auxiliary device 14.

Second Embodiment

Next, a second embodiment will now be described in detail. The same reference numerals are given to those components that are like or the same as the corresponding components of the first embodiment and explanations are omitted.

Figure 6:
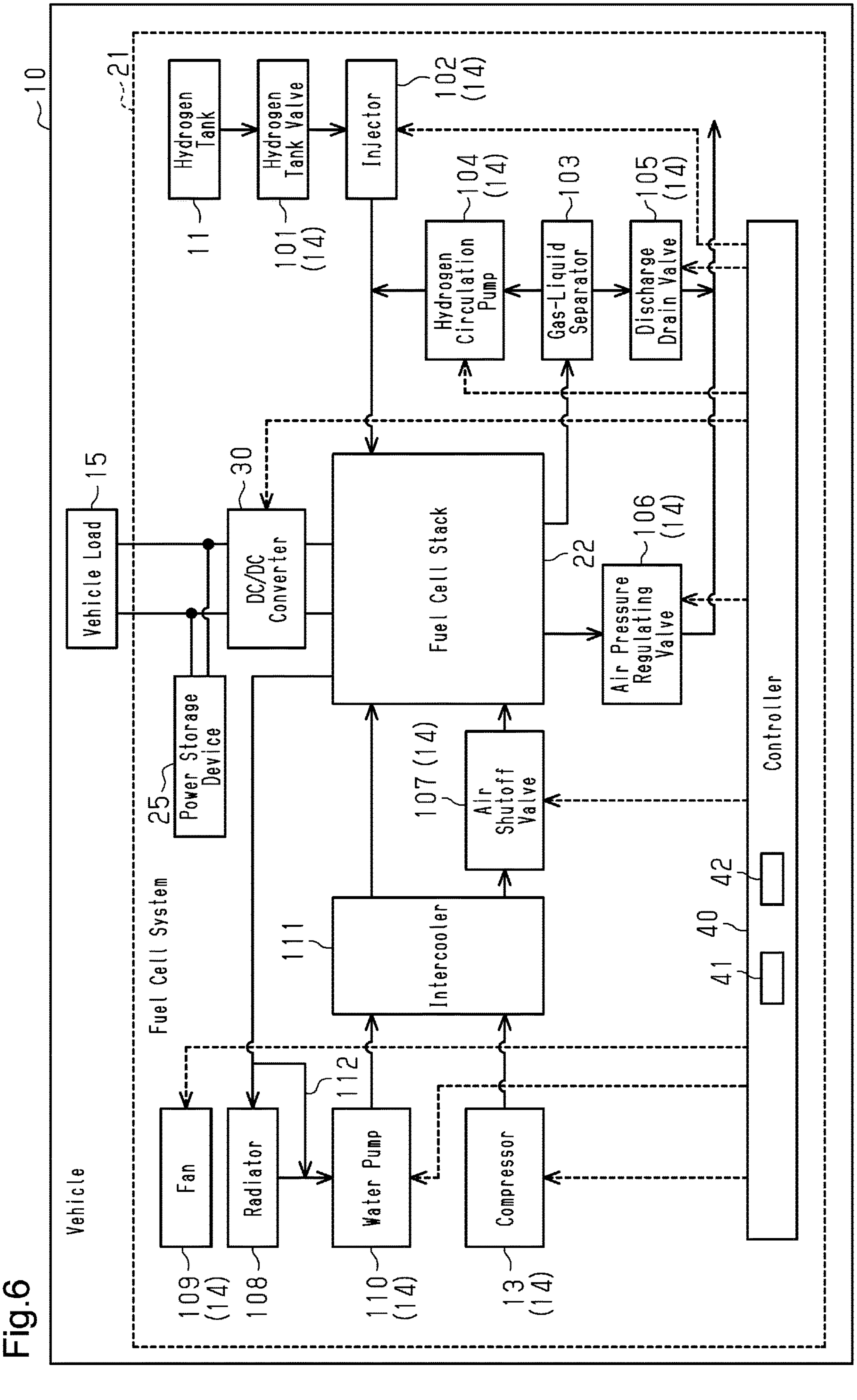
FIG. 6 is a diagram showing an example of a fuel cell system according to a second embodiment.

FIG. 6 is a diagram showing an example of a fuel cell system 21 according to the second embodiment.

The fuel cell system 21 shown in FIG. 6 is mounted on a fuel cell electric vehicle 10 and supplies power to a vehicle load 15 or the like. The fuel cell electric vehicle 10 may be as an industrial vehicle such as a forklift or an automobile.

The fuel cell system 21 includes a fuel cell stack 22, a hydrogen tank 11, a hydrogen tank valve 101, an injector 102, a gas-liquid separator 103, a hydrogen circulation pump 104, a discharge drain valve 105, a compressor 13, an air pressure regulating valve 106, an air shutoff valve 107, a radiator 108, a fan 109, a water pump 110, an intercooler 111, a DC/DC converter 30, a power storage device 25, and a controller 40.

The hydrogen tank valve 101, the injector 102, the hydrogen circulation pump 104, the discharge drain valve 105, the compressor 13, the air pressure regulating valve 106, the air shutoff valve 107, the fan 109, and the water pump 110 are auxiliary devices 14 that consume the power supplied from the fuel cell stack 22, in other words, from the DC/DC converter 30. As the rotation speeds of the motors for driving the hydrogen circulation pump 104, the compressor 13, the fan 109, and the water pump 110 increase, the consumption amount of the power supplied from the fuel cell stack 22 increases. The auxiliary devices 14 such as the compressor 13 and the injector 102 are first auxiliary devices directly involved in the power generation of the fuel cell stack 22. The auxiliary devices 14 such as the hydrogen circulation pump 104, the fan 109, and the water pump 110 are second auxiliary devices that are not directly involved in the power generation of the fuel cell stack 22. That is, the first auxiliary devices, which are directly involved in power generation of the fuel cell stack 22, are auxiliary devices that supply reactant gases (fuel gas and oxidant gas) to the fuel cell stack 22. The second auxiliary devices, which are not directly involved in the power generation of the fuel cell stack 22, are auxiliary devices that do not supply reactant gases to the fuel cell stack 22.

The fuel gas stored in the hydrogen tank 11 is supplied to the fuel cell stack 22 via the hydrogen tank valve 101 and the injector 102.

The hydrogen tank valve 101 reduces the pressure of the fuel gas supplied to the fuel cell stack 22.

The injector 102 adjusts the flow rate of the fuel gas supplied to the fuel cell stack 22.

The gas-liquid separator 103 separates the fuel gas and liquid water discharged from the fuel cell stack 22.

The hydrogen circulation pump 104 supplies the fuel gas separated by the gas-liquid separator 103 to the fuel cell stack 22 again.

The discharge drain valve 105 discharges the liquid water separated by the gas-liquid separator 103 to the outside.

The compressor 13 compresses the oxidant gas and supplies the compressed oxidant gas to the fuel cell stack 22 via the intercooler 111 and the air shutoff valve 107.

The intercooler 111 exchanges heat between the oxidant gas and a coolant such as cooling water flowing through the intercooler 111.

The air shutoff valve 107 shuts off the oxidant gas supplied to the fuel cell stack 22.

The air pressure regulating valve 106 regulates the pressure and/or the flow rate of the oxidant gas supplied to the fuel cell stack 22.

The radiator 108 exchanges heat between the coolant heated by the heat generation of the fuel cell stack 22 and the outside air.

The fan 109 increases a heat radiation amount of the radiator 108. The fuel cell system 21 includes a bypass passage 112, which connects an input side and an output side of the radiator 108 to each other. The coolant output from the fuel cell stack 22 can be supplied to the water pump 110 through the bypass passage 112 without passing through the radiator 108. Therefore, even when the rotation speed of the motor for driving the fan 109 is increased to increase the heat radiation amount of the radiator 108, the coolant is prevented from being in a supercooled (overcooled) state.

The water pump 110 supplies the coolant cooled by the radiator 108 to the fuel cell stack 22 via the intercooler 111.

The DC/DC converter 30 is provided at a subsequent stage of the fuel cell stack 22 and supplies power output from the fuel cell stack 22 to the power storage device 25. The power output from the DC/DC converter 30 can be supplied to the power storage device 25, excluding the power consumed by the auxiliary devices 14.

The power storage device 25 is provided between the DC/DC converter 30 and the loads 14, 15. The power storage device 25 is connected to a power line between the fuel cell stack 22 and the loads 14, 15. The power storage device 25 is connected in parallel with the loads 14, 15. The power storage device 25 supplies power to the vehicle load 15 and the auxiliary devices 14 such as the hydrogen circulation pump 104, the compressor 13, the fan 109, and the water pump 110.

During a normal power generation control, the controller 40 drives each of the various auxiliary devices 14 such as the hydrogen tank valve 101, the injector 102, the hydrogen circulation pump 104, the discharge drain valve 105, the compressor 13, the air pressure regulating valve 106, the air shutoff valve 107, the fan 109, and the water pump 110 such that the power generated in the fuel cell stack 22 becomes a target power Pt. For example, at the start of power generation of the fuel cell stack 22, the controller 40 turns on a power supply of the motors for driving the respective auxiliary devices 14, and then outputs command values indicating target rotation speeds of the respective motors.

During the normal power generation control, the controller 40 changes the target power Pt in accordance with the amount of charge (state of charge) of the power storage device 25. The amount of charge is, for example, a charging rate [%], which is the ratio of the remaining power to a full charge capacity of the power storage device 25, or a voltage [V] of the power storage device 25 when no current is flowing through the power storage device 25.

Further, the controller 40 may be configured to change the target power Pt stepwise in accordance with the amount of charge of the power storage device 25. For example, multiple stages of charging rates having a relationship of charging rate SOC1<charging rate SOC2<charging rate SOC3<charging rate SOC4<charging rate SOC5<charging rate SOC6 are defined. Also, two stage target power Pt having a relationship of a target power Pt1<a target power Pt2 is defined. In this case, when the charging rate of the power storage device 25 decreases in the range of the charging rate SOC3 to the charging rate SOC5, the controller 40 sets the target power Pt to the target power Pt1. When the charging rate of the power storage device 25 decreases in the range of the charging rate SOC1 to the charging rate SOC3, the controller 40 sets the target power Pt to the target power Pt2. When the charging rate of the power storage device 25 increases in the range of the charging rate SOC2 to the charging rate SOC4, the controller 40 sets the target power Pt to the target power Pt2. When the charging rate of the power storage device 25 increases in the range of the charging rate SOC4 to the charging rate SOC6, the controller 40 sets the target power Pt to the target power Pt1.

Figure 7:
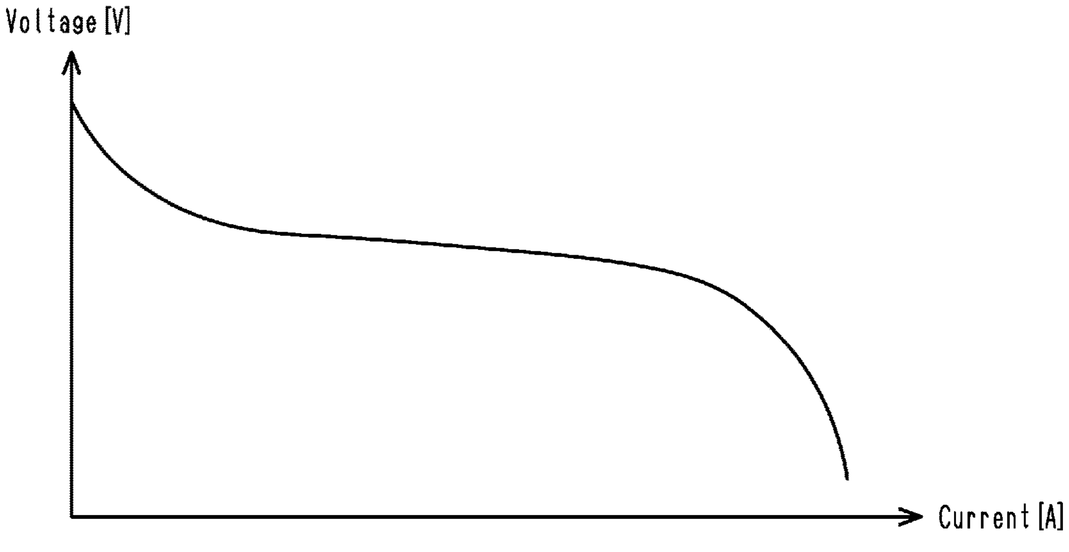
FIG. 7 is a diagram showing an example of the relationship between a current and a voltage output from the fuel cell stack.

FIG. 7 shows an example of the relationship between the current and the voltage output from the fuel cell stack 22 in two dimensional coordinates. In FIG. 7, the horizontal axis represents a current [A], and the vertical axis represents a voltage [V]. The solid line indicates the correspondence between the current and the voltage output from the fuel cell stack 22.

As shown in FIG. 7, as the current output from the fuel cell stack 22 decreases, the voltage output from the fuel cell stack 22 increases. When the voltage output from the fuel cell stack 22 is relatively high, the catalyst required for electrochemical reaction is ionized. In this case, when the voltage output from the fuel cell stack 22 is relatively small in the next cycle, the crystals of the ionized catalyst become large. Therefore, the particle size of the catalyst increases and the total surface area of the entire catalyst decreases, which may cause deterioration of the fuel cell stack 22.

Accordingly, in the second embodiment, when the output voltage of the fuel cell stack 22 is greater than or equal to a specified voltage (determination voltage) Vc, the controller 40 forcibly drives the DC/DC converter 30 to increase the current flowing from the fuel cell stack 22 to the DC/DC converter 30, thereby reducing the voltage output from the fuel cell stack 22. This prevents the voltage output from the fuel cell stack 22 from being relatively high during idling time, such as when the fuel cell electric vehicle 10 is temporarily stopped at a traffic signal, and the current flowing from the fuel cell system 21 to the vehicle load 15 becomes relatively small. The fuel cell stack 22 is thus prevented from deteriorating.

When the fuel cell electric vehicle 10 is traveling downhill, the regenerative power supplied from the fuel cell electric vehicle 10 (i.e., the vehicle load 15) to the fuel cell system 21 is relatively large. Further, when the fuel cell electric vehicle 10 is traveling downhill, the accelerator of the fuel cell electric vehicle 10 is operated by the driver such that the speed of the fuel cell electric vehicle 10 is constant, whereby the acceleration of the fuel cell electric vehicle 10 becomes relatively small.

Therefore, when the regenerative power supplied from the fuel cell electric vehicle 10 to the fuel cell system 21 is relatively large and the acceleration of the fuel cell electric vehicle 10 is relatively small, there is a high possibility that the fuel cell electric vehicle 10 is traveling downhill.

When the fuel cell electric vehicle 10 is traveling downhill, regenerative power is supplied from the fuel cell electric vehicle 10 to the fuel cell system 21 for a relatively long period of time. This increases the possibility that the power storage device 25 will be in an overcharged state.

In this regard, in the second embodiment, when the regenerative power supplied from the fuel cell electric vehicle 10 to the fuel cell system 21 is greater than or equal to a specified power (determination voltage) and the acceleration of the fuel cell electric vehicle 10 is less than or equal to a specified acceleration (determination acceleration), that is, when the fuel cell electric vehicle 10 is likely to be traveling downhill and the power storage device 25 is likely to be overcharged, the controller 40 forcibly drives the second auxiliary devices, which are not directly involved in the power generation of the fuel cell stack 22, so that the output voltage of the fuel cell stack 22 does not become relatively high, while stopping the power generation of the fuel cell stack 22.

The controller 40 obtains a multiplication result of the voltage output from the fuel cell electric vehicle 10 to the fuel cell system 21 and the current flowing from the fuel cell electric vehicle 10 to the fuel cell system 21 as regenerative power supplied from the fuel cell electric vehicle 10 to the fuel cell system 21. Further, the controller 40 receives the speed [km/h] of the fuel cell electric vehicle 10 from a travel controlling unit (not shown) mounted on the fuel cell electric vehicle 10, and obtains the amount of change in the speed of the fuel cell electric vehicle 10 per unit time as the acceleration of the fuel cell electric vehicle 10. The speed of the fuel cell electric vehicle 10 can be obtained from, for example, (rotation speed of traveling motor×tire outer diameter×circular constant)/(gear ratio×reduction ratio). Alternatively, the controller 40 receives the acceleration of the fuel cell electric vehicle 10 obtained by an acceleration sensor from the traveling controlling unit.

As described above, when the fuel cell electric vehicle 10 is likely to be traveling downhill and the power storage device 25 is likely to be overcharged, the controller 40 drives the second auxiliary devices, which are not directly involved in the power generation of the fuel cell stack 22, while stopping the power generation of the fuel cell stack 22. This prevents the output of the fuel cell stack 22 from having a high potential even if the power supplied from the fuel cell stack 22 is consumed by the second auxiliary devices to prevent the power storage device 25 from being overcharged. The fuel cell stack 22 is thus prevented from deteriorating. That is, it is possible to prevent the fuel cell stack 22 from deteriorating while preventing the power storage device 25 from being overcharged.

When the regenerative power supplied from the fuel cell electric vehicle 10 to the fuel cell system 21 is relatively small, the power storage device 25 is unlikely to be overcharged. In this case, since it is not necessary to stop the power generation of the fuel cell stack 22 or drive the second auxiliary devices, the controller 40 continues the normal power generation control.

In a situation in which the regenerative power supplied from the fuel cell electric vehicle 10 to the fuel cell system 21 is relatively large, and the acceleration of the fuel cell electric vehicle 10 is relatively large, there is a high possibility that the regenerative power has temporarily become relatively large when the fuel cell electric vehicle 10 traveling on a flat road decelerates. In such a case, since it is not necessary to stop the power generation of the fuel cell stack 22 or drive the second auxiliary devices, the controller 40 continues the normal power generation control.

When the regenerative power is greater than or equal to the specified power and the acceleration of the fuel cell electric vehicle 10 is less than or equal to the specified acceleration, the controller 40 increments a counter value. When the regenerative power is smaller than the specified power or when the acceleration of the fuel cell electric vehicle 10 is larger than the specified acceleration, the controller 40 decrements the counter value. When the counter value becomes greater than or equal to a threshold C1th (first threshold), the controller 40 determines that the fuel cell electric vehicle 10 is traveling downhill and turns on a downhill flag. When the downhill flag is on, the controller 40 stops the power generation of the fuel cell stack 22 and drives the second auxiliary devices, which are not directly involved in the power generation of the fuel cell stack 22. That is, when the counter value becomes greater than or equal to the threshold C1th as the result of incrementing or decrementing the counter value, the controller 40 stops the power generation of the fuel cell stack 22 and drives the second auxiliary devices, which are not directly involved in the power generation of the fuel cell stack 22.

As a result, the fuel cell stack 22 is prevented from frequently stopping and restarting power generation due to fluctuations in the regenerative power and the acceleration of the fuel cell electric vehicle 10. Frequent repetition of stop of power generation stop and restart of power generation of the fuel cell stack 22 affects the traveling of the fuel cell electric vehicle 10 and causes discomfort to the driver of the fuel cell electric vehicle 10. Prevention of such frequent repetition prevents the driver from experiencing discomfort with traveling of the fuel cell electric vehicle 10.

The controller 40 may be configured to prepare to drive the second auxiliary devices, which are not directly involved in the power generation of the fuel cell stack 22, when the counter value becomes greater than or equal to a threshold C2th (second threshold), which is less than the threshold C1th.

Accordingly, as compared with a case in which the preparation for driving the second auxiliary devices is not made before the counter value becomes greater than or equal to the threshold C1th, the second auxiliary devices can be driven to consume the power supplied from the fuel cell stack 22 immediately after the counter value becomes greater than or equal to the threshold C1th. Thus, the power storage device 25 is further effectively prevented from being overcharged.

The controller 40 may be configured to stop the power generation of the fuel cell stack 22 and then drive, among the multiple second auxiliary devices, one or more second auxiliary devices corresponding to the amount of charge of the power storage device 25, when the regenerative power is greater than or equal to the specified power and the acceleration of the fuel cell electric vehicle 10 is less than or equal to the specified acceleration. For example, the controller 40 may be configured to drive a number of second auxiliary devices that corresponds to the amount of charge of the power storage device 25. Alternatively, the controller 40 may be configured to select one or more second auxiliary devices to be driven from among multiple second auxiliary devices having different power consumptions in accordance with the amount of charge of the power storage device 25.

A case will now be considered in which, when power generation of the fuel cell stack 22 is stopped, the controller 40 performs any one of the following operation controls 1) to 4).

1) The controller 40 sets the rotation speed of the motor for driving the water pump 110 to a maximum rotation speed.
2) The controller 40 sets the rotation speeds of the motors for driving the water pump 110 and the hydrogen circulation pump 104 to respective maximum rotation speeds.
3) The controller 40 sets the rotation speeds of the motors for driving the water pump 110, the hydrogen circulation pump 104, and the fan 109 to the respective maximum rotation speeds.
4) The controller 40 sets the rotation speeds of the motors for driving the water pump 110, the hydrogen circulation pump 104, and the fan 109 to the respective maximum rotation speeds, increases the rotation speed of the motor for driving the compressor 13, and increases the specified voltage Vc for avoiding high potential.

When the operation control of the above 4) is performed, the consumption amount of the power supplied from the fuel cell stack 22 is the largest. When the operation control of the above 3) is performed, the consumption amount of the power supplied from the fuel cell stack 22 is the second largest. When the operation control of the above 2) is performed, the consumption amount of the power supplied from the fuel cell stack 22 is the third largest. When the operation control of the above 1) is performed, the consumption amount of power supplied from the fuel cell stack 22 is minimized. Further, when the operation control of the above 1) is performed, the influence on the deterioration of the fuel cell stack 22 is the smallest. When the operation control of the above 2) is performed, the influence on the deterioration of the fuel cell stack 22 is the second smallest. When the operation control of the above 3) is performed, the influence on the deterioration of the fuel cell stack 22 is the third smallest. When the operation control of the above 4) is performed, the influence on the deterioration of the fuel cell stack 22 is the fourth smallest. Regarding the amount of charge of the power storage device 25, multiple stages of thresholds having a relationship of threshold S1th<threshold S2th<threshold S3th<threshold S4th are defined.

In this case, when the regenerative power is greater than or equal to the specified power and the acceleration of the fuel cell electric vehicle 10 is less than or equal to the specified acceleration, the controller 40 stops power generation of the fuel cell stack 22. The controller 40 performs the operation control of the above 1) when the amount of charge of the power storage device 25 is greater than or equal to the threshold S1th, performs the operation control 2) when the amount of charge of the power storage device 25 is greater than or equal to the threshold S2th, performs the operation control 3) when the amount of charge of the power storage device 25 is greater than or equal to the threshold S3th, and performs the operation control 4) when the amount of charge of the power storage device 25 is greater than or equal to the threshold S4th.

When the power generation of the fuel cell stack 22 is stopped and the amount of charge of the power storage device 25 is greater than or equal to the threshold S1th, the operation control of the above 1) is performed by the controller 40. This allows the power of the power storage device 25 to be consumed while minimizing the influence on the deterioration of the fuel cell stack 22. When the power generation of the fuel cell stack 22 is stopped and the amount of charge of the power storage device 25 is greater than or equal to the threshold S2th, the operation control of the above 2) is performed by the controller 40. This allows the power of the power storage device 25 to be consumed while reducing the influence on the deterioration of the fuel cell stack 22. When the power generation of the fuel cell stack 22 is stopped and the amount of charge of the power storage device 25 is greater than or equal to the threshold S3th, the operation control of the above 3) is performed by the controller 40. This reduces the influence on the deterioration of the fuel cell stack 22 while increasing the consumption amount of the power of the power storage device 25. When the power generation of the fuel cell stack 22 is stopped and the amount of charge of the power storage device 25 is greater than or equal to the threshold S4th, the operation control of the above 4) is performed by the controller 40. This reduces the influence on the deterioration of the fuel cell stack 22 while maximizing the consumption amount of the power of the power storage device 25.

As described above, when the fuel cell electric vehicle 10 is likely to be traveling downhill and the power storage device 25 is likely to be overcharged, operation of the auxiliary devices is controlled appropriately in accordance with the amount of charge of the power storage device 25. Thus, it is possible to prevent the fuel cell stack 22 from deteriorating while preventing the power storage device 25 from being overcharged.

Figure 8:
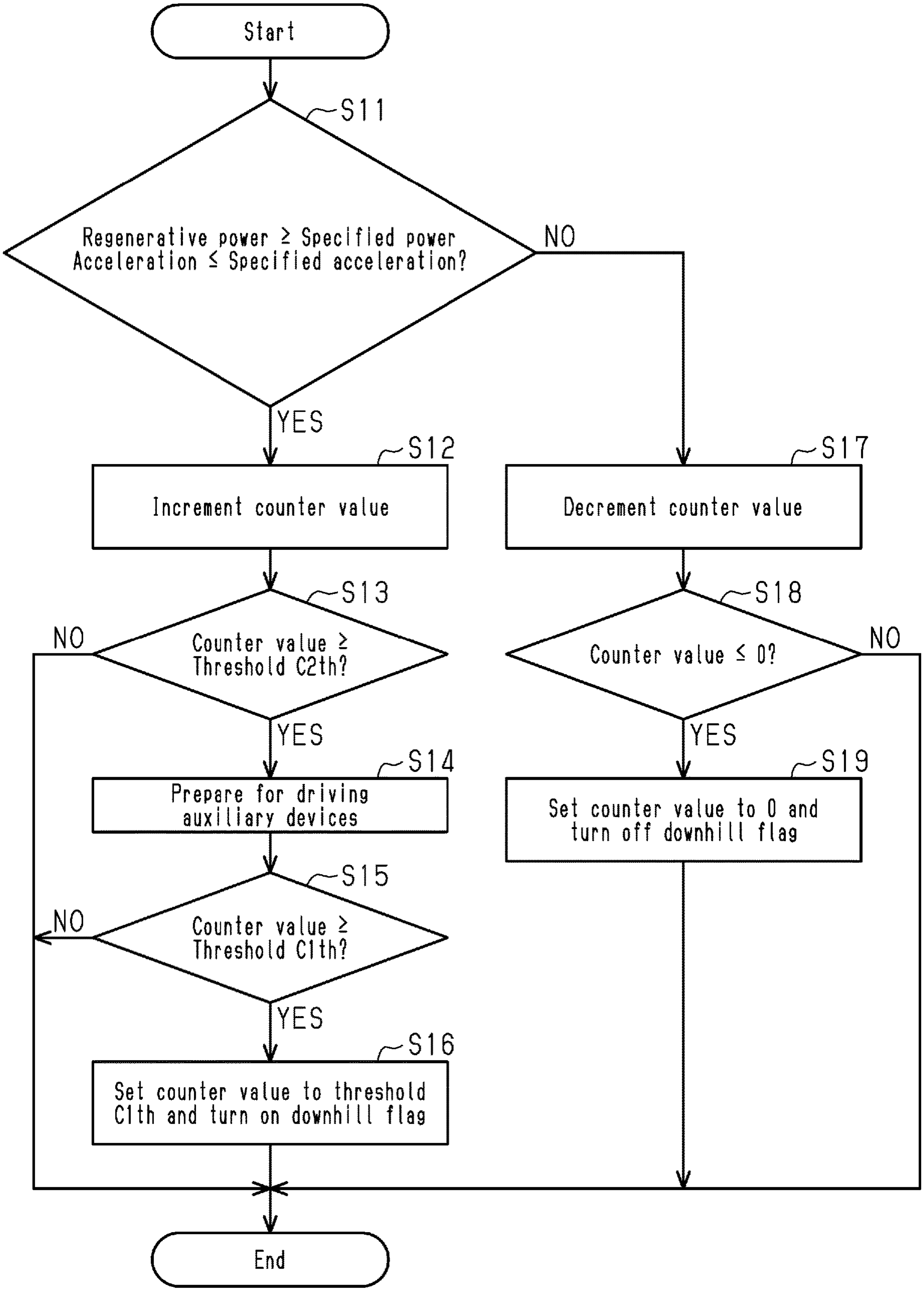
FIG. 8 is a flowchart showing an example of a downhill flag switching process.

FIG. 8 is a flowchart showing an example of operation of the controller 40 in a downhill flag switching process. The process shown in FIG. 8 is repeatedly executed at a specific timing or at constant intervals.

First, when the regenerative power supplied from the fuel cell electric vehicle 10 to the fuel cell system 21 is greater than or equal to the specified power and the acceleration of the fuel cell electric vehicle 10 is less than or equal to the specified acceleration (step S11: Yes), the controller 40 increments the counter value (step S12).

Next, when the counter value is greater than or equal to the threshold C2th (second threshold) (step S13: Yes), the controller 40 prepares for driving of various auxiliary devices (step S14).

Then, when the counter value is greater than or equal to the threshold C1th (first threshold) (step S15: Yes), the controller 40 sets the counter value to the same value as the threshold C1th, turns on the downhill flag (step S16), and ends the downhill flag switching process.

In contrast, when the regenerative power supplied from the fuel cell electric vehicle 10 to the fuel cell system 21 is less than the specified power and the acceleration of the fuel cell electric vehicle 10 is greater than the specified acceleration (step S11: No), the controller 40 decrements the counter value (step S17).

Next, when the counter value is less than or equal to 0 (step S18: Yes), the controller 40 sets the counter value to 0, turns off the downhill flag (step S19), and ends the downhill flag switching process.

When the counter value is less than the threshold C2th (step S13: No), when the counter value is less than the threshold C1th (step S15: No), or when the counter value is greater than 0 (step S18: No), the controller 40 ends the downhill flag switching process.

Figure 9:
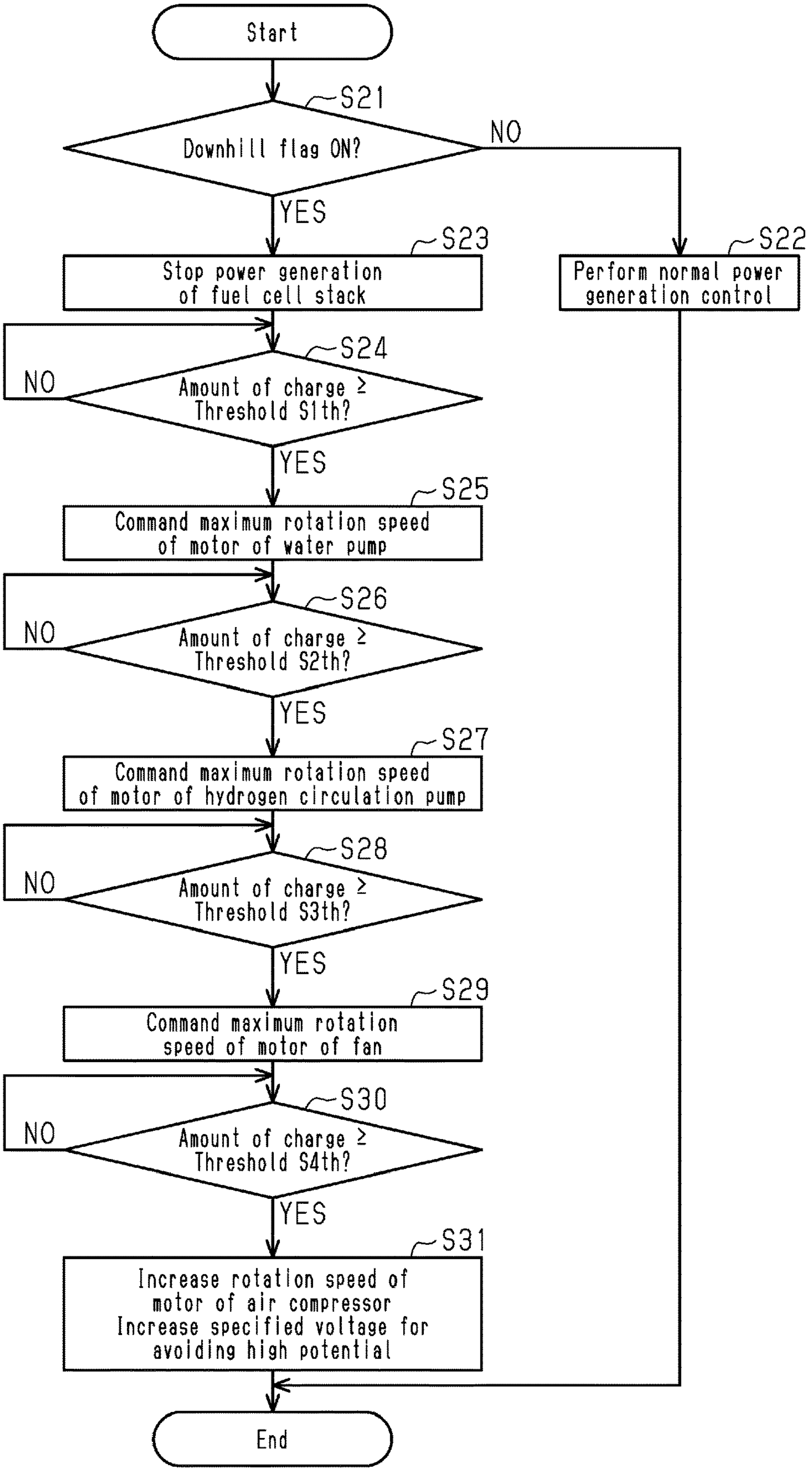
FIG. 9 is a flowchart showing an example of a power generation controlling process.

FIG. 9 is a flowchart showing an example of operation of the controller 40 in a power generation controlling process.

First, when the downhill flag is off (step S21: No), the controller 40 performs the normal power generation control (step S22).

When the downhill flag is on (step S21: Yes), the controller 40 stops the power generation of the fuel cell stack 22 (step S23).

Next, when the amount of charge of the power storage device 25 is greater than or equal to the threshold S1th (step S24: Yes), the controller 40 outputs a command value to maximize the rotation speed of the motor for driving the water pump 110 (step S25).

Then, when the amount of charge of the power storage device 25 is greater than or equal to the threshold S2th (step S26: Yes), the controller 40 outputs a command value to maximize the rotation speed of the motor for driving the hydrogen circulation pump 104 (step S27). In step S27, the controller 40 continues to output the command value for maximizing the rotation speed of the motor for driving the water pump 110.

When the amount of charge of the power storage device 25 is greater than or equal to the threshold S3th (step S28: Yes), the controller 40 outputs a command value to maximize the rotation speed of the motor for driving the fan 109 (step S29). In step S29, the controller 40 continues to output the command values for maximizing the rotation speed of the motor for driving the water pump 110 and the rotation speed of the motor for driving the hydrogen circulation pump 104.

Subsequently, when the amount of charge of the power storage device 25 is greater than or equal to the threshold S4th (step S30: Yes), the controller 40 increases the rotation speed of the motor for driving the compressor 13 and increases the specified voltage Vc for avoiding high potential (step S31). In step S31, the controller 40 continues to output the command values for maximizing the rotation speed of the motor for driving the water pump 110, the rotation speed of the motor for driving the hydrogen circulation pump 104, and the rotation speed of the fan 109.

Third Embodiment

A third embodiment will now be described. The same reference numerals are given to those components that are like or the same as the corresponding components of the first embodiment and explanations are omitted.

Figure 10:
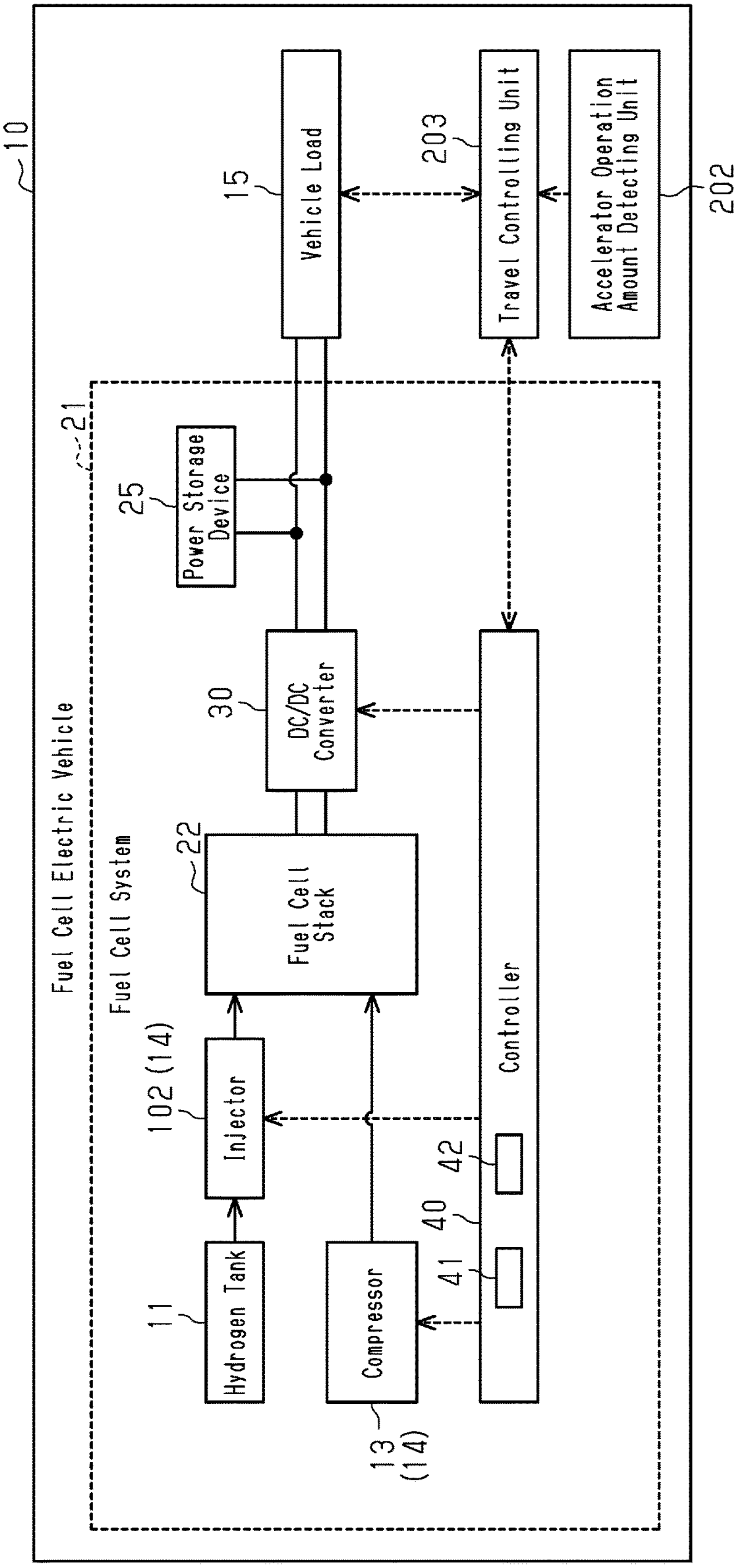
FIG. 10 is a diagram showing an example of a fuel cell electric vehicle according to a third embodiment.

FIG. 10 is a diagram showing an example of a fuel cell electric vehicle 10 according to the third embodiment.

The fuel cell electric vehicle 10 shown in FIG. 10 is an industrial vehicle such as a forklift or an automobile, and includes a vehicle load 15, a fuel cell system 21, an accelerator operation amount detecting unit 202, and a travel controlling unit 203.

The fuel cell system 21 includes a fuel cell stack 22, a hydrogen tank 11, an injector 102, a compressor 13, a DC/DC converter 30, a power storage device 25, and a controller 40. The fuel cell system 21 is not limited to the configuration shown in FIG. 10.

Fuel gas stored in the hydrogen tank 11 is supplied to the fuel cell stack 22 via the injector 102.

The injector 102 adjusts the flow rate of the fuel gas supplied to the fuel cell stack 22.

The compressor 13 compresses oxidant gas and supplies the compressed oxidant gas to the fuel cell stack 22.

The DC/DC converter 30 is provided at a subsequent stage of the fuel cell stack 22 and supplies power output from the fuel cell stack 22 to the power storage device 25. The power output from the DC/DC converter 30 can be supplied to the power storage device 25, excluding the power consumed by the auxiliary devices 14 such as the compressor 13.

The power storage device 25 is provided between the DC/DC converter 30 and the loads 14, 15. The power storage device 25 is connected to a power line between the fuel cell stack 22 and the loads 14, 15. The power storage device 25 is connected in parallel with the loads 14, 15. The power storage device 25 supplies power to the vehicle load 15 and the auxiliary devices 14 such as the compressor 13.

The storage unit 42 of the controller 40 stores a specified requested power, a specified speed, a specified accelerator operation amount, a specified acceleration, and the like, which will be discussed below. The specified requested power, the specified speed, the specified accelerator operation amount, and the specified acceleration are also referred to as a determination requested power, a determination speed, a determination accelerator operation amount, and a determination acceleration, respectively.

During the normal power generation control, the controller 40 controls operation of the injector 102, the compressor 13, and the like such that the power generated by the fuel cell stack 22 becomes the target power Pt.

During the normal power generation control, the controller 40 changes the target power Pt in accordance with the amount of charge (state of charge) of the power storage device 25. The amount of charge is, for example, a charging rate [%], which is the ratio of the remaining power to a full charge capacity of the power storage device 25, or an open circuit voltage [V] of the power storage device 25 when no current is flowing through the power storage device 25.

Further, the controller 40 may be configured to change the target power Pt stepwise in accordance with the amount of charge of the power storage device 25.

Figure 11:
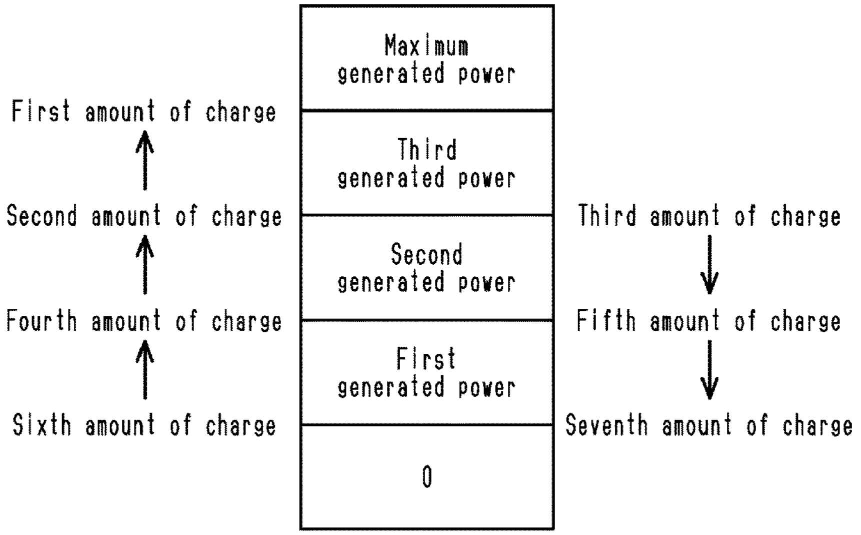
FIG. 11 is a diagram for explaining a power generation control of the fuel cell stack.

FIG. 11 is a diagram for explaining a power generation control of the fuel cell stack 22. Multiple stages of amount of charge having a relationship of first amount of charge<second amount of charge<third amount of charge<fourth amount of charge<fifth amount of charge<sixth amount of charge<seventh amount of charge are defined. Also, multiple stages of generated power having a relationship of first generated power<second generated power<third generated power<maximum generated power are defined. The difference between the first generated power and the second generated power, the difference between the second generated power and the third generated power, and the difference between the third generated power and the maximum generated power may be a constant value or any values.

When the amount of charge of the power storage device 25 is less than the sixth amount of charge, the controller 40 changes the target power Pt from 0 to the first generated power. When the amount of charge of the power storage device 25 is less than the fourth amount of charge, the controller 40 changes the target power Pt from the first generated power to the second generated power. When the amount of charge of the power storage device 25 is less than the second amount of charge, the controller 40 changes the target power Pt from the second generated power to the third generated power. When the amount of charge of the power storage device 25 is less than the first amount of charge, the controller 40 changes the target power Pt from the third generated power to the maximum generated power. When the amount of charge of the power storage device 25 is greater than the third amount of charge, the controller 40 changes the target power Pt from the maximum generated power or the third generated power to the second generated power. When the amount of charge of the power storage device 25 is greater than the fifth amount of charge, the controller 40 changes the target power Pt from the second generated power to the first generated power. When the amount of charge of the power storage device 25 is greater than the seventh amount of charge, the controller 40 changes the target power Pt from the first generated power to 0.

The accelerator operation amount detecting unit 202 shown in FIG. 10 includes a potentiometer or the like connected to the accelerator pedal. The accelerator operation amount detecting unit 202 detects an accelerator operation amount O, which is an operation amount of the accelerator pedal by the driver, and sends the detected accelerator operation amount O to the travel controlling unit 203.

The travel controlling unit 203 includes a microcomputer. The travel controlling unit 203 may have a configuration similar to that of the controller 40. The travel controlling unit 203 controls operation of the vehicle load 15 to control travel, cargo handling, and the like of the fuel cell electric vehicle 10.

In addition, the travel controlling unit 203 obtains a requested power Pr (power needed to drive the vehicle load 15) that the travel controlling unit 203 requests from the power storage device 25. For example, the travel controlling unit 203 obtains, as the requested power Pr, the product of the output voltage of the power storage device 25 and the current flowing from the power storage device 25 to the vehicle load 15, or the power consumption of the vehicle load 15 predicted from operation control of the vehicle load 15.

In addition, the travel controlling unit 203 obtains a speed V [m/s] and an acceleration A $[m/s^2]$ of the fuel cell electric vehicle 10. For example, the travel controlling unit 203 obtains the speed V from a calculation result of (rotation speed [rpm] of traveling motor×tire outer diameter [m]×circular constant)/(gear ratio×reduction ratio). Further, the travel controlling unit 203 obtains the acceleration A from the amount of change of the speed V per second. The travel controlling unit 203 may be configured to obtain the acceleration A based on an output value of an acceleration sensor mounted on the fuel cell electric vehicle 10 or a torque sensor connected to the traveling motor.

Based on the requested power Pr, the speed V, the accelerator operation amount O, and the acceleration A, the travel controlling unit 203 determines whether the fuel cell electric vehicle 10 is traveling uphill, that is, whether the fuel cell electric vehicle 10 is moving up an upward slope having a gradient.

In general, the power consumed by the traveling motor tends to increase as the gradient [%] of the upward slope increases. Particularly, when the fuel cell electric vehicle 10 is an industrial vehicle, the weight of the fuel cell electric vehicle 10 is relatively large. Thus, the power consumed by the traveling motor tends to further increase as the gradient of the upward slope increases. In addition, the speed of the fuel cell electric vehicle 10 tends to decrease as the gradient of the upward slope increases. Further, when the fuel cell electric vehicle 10 is traveling uphill, the speed of the fuel cell electric vehicle 10 is lower than that when the fuel cell electric vehicle 10 is traveling on a flat road. Therefore, the operation amount of the accelerator pedal tends to be relatively large due to the psychology of the driver trying to maintain the same speed as that on a flat road. When the fuel cell electric vehicle 10 is traveling uphill, the speed of the fuel cell electric vehicle 10 tends to be constant, and thus the acceleration of the fuel cell electric vehicle 10 tends to be relatively small. That is, when the fuel cell electric vehicle 10 is traveling uphill, the requested power Pr and the accelerator operation amount O become relatively large, and the speed V and the acceleration A become relatively small.

Thus, the travel controlling unit 203 determines that the fuel cell electric vehicle 10 is traveling uphill when the requested power Pr is greater than or equal to the specified requested power, the speed V is less than or equal to the specified speed, the accelerator operation amount O is greater than or equal to the specified accelerator operation amount, and the acceleration A is less than or equal to the specified acceleration. In contrast, the travel controlling unit 203 determines that the fuel cell electric vehicle 10 is not traveling uphill when the requested power Pr is less than the specified requested power, when the speed V is greater than the specified speed, when the accelerator operation amount O is less than the specified accelerator operation amount, or when the acceleration A is greater than the specified acceleration. The specified accelerator operation amount is not limited to 100% (the accelerator operation amount being maximum), and is set after experimentally and empirically obtaining an operation amount that is estimated to be actually taken by the driver when traveling uphill.

When determining that the fuel cell electric vehicle 10 is traveling uphill, the travel controlling unit 203 notifies the controller 40 of the fuel cell system 21 of the determination using an uphill flag, thereby increasing the generated power of the fuel cell stack 22 to be greater than the current generated power.

Figure 12:
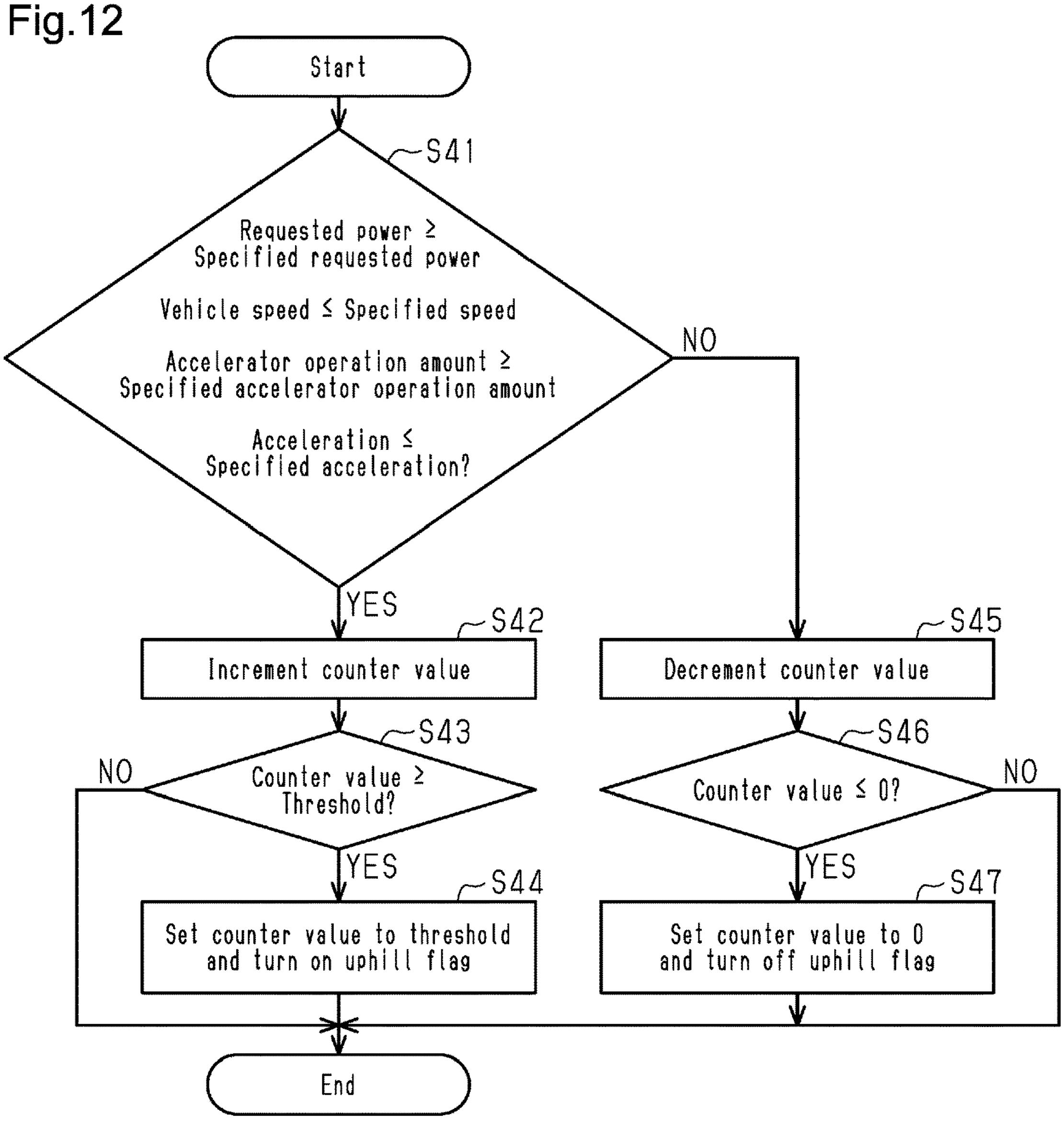
FIG. 12 is a flowchart showing an example of operation of a travel controlling unit.

FIG. 12 is a flowchart showing an example of operation of the travel controlling unit 203 in an uphill flag switching process. The uphill flag switching process shown in FIG. 12 is repeatedly executed at a specific timing or at constant intervals.

First, when the requested power Pr is greater than or equal to the specified requested power, the speed V is less than or equal to the specified speed, the accelerator operation amount O is greater than or equal to the specified accelerator operation amount, and the acceleration A is less than or equal to the specified acceleration (step S41: Yes), the travel controlling unit 203 increments the counter value of the counter (step S42).

Next, when the counter value is greater than or equal to a threshold (step S43: Yes), the travel controlling unit 203 sets the counter value to the same value as the threshold, turns on the uphill flag (step S44), and ends the uphill flag switching process. When the uphill flag is turned on, the travel controlling unit 203 may determine that the fuel cell electric vehicle 10 is traveling uphill. This prevents the fuel cell electric vehicle 10 from being frequently determined to be traveling uphill due to fluctuations in the requested power Pr, the speed V, the accelerator operation amount O, or the acceleration A. If the fuel cell electric vehicle 10 is frequently determined to be traveling uphill, the frequent determinations affect the traveling of the fuel cell electric vehicle 10 and cause discomfort to the driver of the fuel cell electric vehicle 10. Prevention of such frequent determinations prevents the driver from experiencing discomfort with traveling of the fuel cell electric vehicle 10.

In contrast, the travel controlling unit 203 decrements the counter value (step S45) when the requested power Pr is less than the specified requested power, when the speed V is greater than the specified speed, when the accelerator operation amount O is less than the specified accelerator operation amount, or when the acceleration A is greater than the specified acceleration (step S41: No).

Next, when the counter value is less than or equal to 0 (step S46: Yes), the travel controlling unit 203 sets the counter value to 0, turns off the uphill flag (step S47), and ends the uphill flag switching process. When the uphill flag is turned off, the travel controlling unit 203 may determine that the fuel cell electric vehicle 10 is not traveling uphill. This prevents the fuel cell electric vehicle 10 from being frequently determined to not be traveling uphill due to fluctuations in the requested power Pr, the speed V, the accelerator operation amount O, or the acceleration A. If the fuel cell electric vehicle 10 is frequently determined to not be traveling uphill, the frequent determinations affect the traveling of the fuel cell electric vehicle 10 and cause discomfort to the driver of the fuel cell electric vehicle 10. Prevention of such frequent determinations prevents the driver from experiencing discomfort with traveling of the fuel cell electric vehicle 10.

When the counter value is less than the threshold (step S43: No) or when the counter value is greater than 0 (step S46: No), the travel controlling unit 203 ends the uphill flag switching process.

Figure 13:
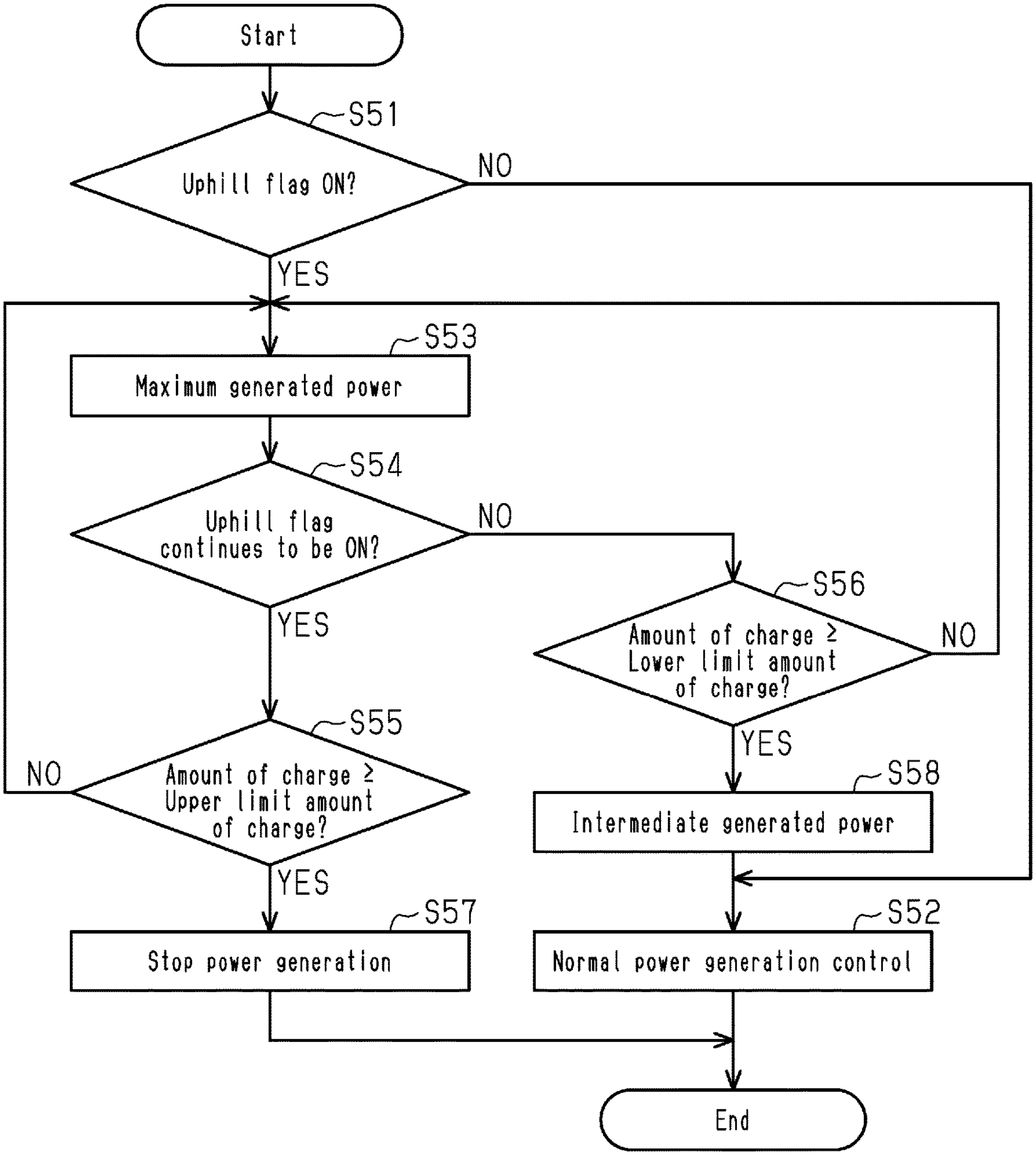
FIG. 13 is a flowchart showing an example of operation of a controller.

FIG. 13 is a flowchart showing an example of operation of the controller 40.

First, when the uphill flag is off (step S51: No), the controller 40 performs a normal power generation control (step S52). For example, as the normal power generation control, the controller 40 switches the target power stepwise as shown in FIG. 11 in accordance with the amount of charge of the power storage device 25.

When the uphill flag is on (step S51: Yes), the controller 40 sets the target power to the maximum generated power (step S53). The controller 40 may be configured to gradually increase the generated power of the fuel cell stack 22 to the maximum generated power when increasing the generated power of the fuel cell stack 22 to the maximum generated power. Specifically, when the target power Pt is increased from the current generated power, an upper limit may be set for the amount of change in the generated power. This prevents the power applied from the fuel cell stack 22 to the auxiliary device 14 from increasing abruptly.

Next, when the uphill flag is continuously on (step S54: Yes), and the amount of charge of the power storage device 25 is less than an upper limit amount of charge (step S55: No), the controller 40 continuously sets the target power to the maximum generated power (step S53). When the uphill flag is switched from the on state to the off state (step S54: No), and the amount of charge of the power storage device 25 is less than a lower limit amount of charge (step S56: No), the controller 40 continues to set the target power to the maximum generated power (step S53). For example, a case will be described in which the upper limit amount of charge is the seventh amount of charge shown in FIG. 11 and the lower limit amount of charge is the third amount of charge shown in FIG. 11. In this case, when the uphill flag is continuously on (step S54: Yes), and the amount of charge of the power storage device 25 is less than the seventh amount of charge (step S55: No), the controller 40 continuously sets the target power to the maximum generated power (step S53). When the uphill flag is switched from the on state to the off state (step S54: No), and the amount of charge of the power storage device 25 is less than the third amount of charge (step S56: No), the controller 40 continues to set the target power to the maximum generated power (step S53). Accordingly, even in a situation in which the fuel cell electric vehicle 10 continues to travel uphill, and the power storage device 25 is likely to be over-discharged, the power storage device 25 continues to be charged until the amount of charge of the power storage device 25 reaches the upper limit amount of charge while the fuel cell electric vehicle 10 travels uphill. This prevents the power storage device 25 from being over-discharged.

In addition, in a case in which the uphill flag is continuously in the on state (step S54: Yes), when the amount of charge of the power storage device 25 is greater than or equal to the upper limit amount of charge (step S55: Yes), the controller 40 sets the target power to 0 and stops the power generation of the fuel cell stack 22 (step S57).

When the amount of charge of the power storage device 25 is greater than or equal to the lower limit amount of charge (step S56: Yes) after the uphill flag is switched from the on state to the off state (step S54: No), the controller 40 sets the target power to the intermediate generated power (step S58) and then proceeds to the normal power generation control (step S52). For example, a case will be described in which the intermediate generated power is the second generated power shown in FIG. 11. In this case, when the amount of charge of the power storage device 25 is greater than or equal to the lower limit amount of charge (step S56: Yes) after the uphill flag is switched from the on state to the off state (step S54: No), the controller 40 sets the target power to the second generated power (step S58) and then proceeds to the normal power generation control (step S52). Thus, in a state in which the fuel cell electric vehicle 10 is traveling on a flat road after traveling uphill, the target power is set to the intermediate generated power. Therefore, it is possible to easily shift from the generated power control at the time of the uphill determination to the normal generated power control.

As described above, the travel controlling unit 203 according to the third embodiment is configured to increase the generated power of the fuel cell stack 22 from the current generated power when determining that the fuel cell electric vehicle 10 is traveling uphill using the requested power Pr, the speed V, the accelerator operation amount O, and the acceleration A. Thus, it is not necessary to wait for a state to continue for the specified time in which the current flowing from the fuel cell system 21 to the vehicle load 15 is greater than or equal to the specified current. Therefore, even when the remaining power of the power storage device 25 is relatively small, the remaining power of the power storage device 25 can be rapidly increased. This prevents the power storage device 25 from being over-discharged.

Also, the travel controlling unit 203 according to the third embodiment is configured to determine that the fuel cell electric vehicle 10 is traveling uphill using four parameters: the requested power Pr, the speed V, the accelerator operation amount O, and the acceleration A. This improves the accuracy of the determination as to whether the fuel cell electric vehicle 10 is traveling uphill as compared with a case in which the determination as to whether the fuel cell electric vehicle 10 is traveling uphill is made using at least three parameters among the four parameters: the requested power Pr, the speed V, the accelerator operation amount O, and the acceleration A. Further, since the four parameters: the requested power Pr, the speed V, the accelerator operation amount O, and the acceleration A, are detected by existing sensors or the like, it is not necessary to newly provide a gradient detection sensor or the like. This prevents the manufacturing costs of the fuel cell electric vehicle 10 from being increased.

Also, the travel controlling unit 203 according to the third embodiment is configured to increase the generated power of the fuel cell stack 22 from the current generated power when determining that the fuel cell electric vehicle 10 is traveling uphill. This allows the power storage device 25 to maintain a relatively high voltage when the fuel cell electric vehicle 10 is traveling uphill or after the fuel cell electric vehicle 10 has traveled uphill. Accordingly, the current flowing from the power storage device 25 to the various auxiliary devices 14 can be made relatively small, and the loss in the power storage device 25 is reduced.

The travel controlling unit 203 according to the third embodiment includes two power generation control systems. One of the power generation control systems changes the generated power of the fuel cell stack 22 in accordance with the amount of charge of the power storage device 25 in a range of 0 to the maximum generated power when determining that the fuel cell electric vehicle 10 is not traveling uphill. The other power generation control system prioritizes increasing the generated power of the fuel cell stack 22 to the maximum generated power when determining that the fuel cell electric vehicle 10 is traveling uphill. In this manner, a configuration with two power generation control systems is capable of optimizing the power generation control of the fuel cell stack 22 as compared to a configuration having only one power generation control system (for example, a power generation control system that changes the generated power of the fuel cell stack 22 in accordance with the amount of charge of the power storage device 25).

In the third embodiment, the controller 40 may be configured to determine whether the fuel cell electric vehicle 10 is traveling uphill, in place of the travel controlling unit 203. In such a configuration, the controller 40 receives the requested power Pr, the speed V, the accelerator operation amount O, and the acceleration A, which are periodically transmitted from the travel controlling unit 203, and determines whether the fuel cell electric vehicle 10 is traveling uphill using the received requested power Pr, speed V, accelerator operation amount O, and acceleration A.

Even with this configuration, it is not necessary to wait for a state to continue for the specified time in which the current flowing from the fuel cell system 21 to the vehicle load 15 is greater than or equal to the specified current. Therefore, even when the remaining power of the power storage device 25 is relatively small, the remaining power of the power storage device 25 can be rapidly increased. This prevents the power storage device 25 from being over-discharged.

In each of the first to third embodiments, the DC/DC converter 30 may have any configuration. The DC/DC converter 30 may be an insulated type or a non-insulated type.

In each of the first to third embodiments, the device for controlling the generated power of the fuel cell stack 22 and the device for controlling the DC/DC converter 30 may be separate devices. That is, the controller 40 may be a unit including multiple devices.

At least two or more embodiments among the first to third embodiments may be combined.

The invention claimed is:

1. A fuel cell system, comprising:

a fuel cell stack configured to supply power to a load;

a power storage device connected in parallel with the load;

a state-of-charge detecting unit configured to detect a state of charge of the power storage device;

a generated power detecting unit configured to detect generated power of the fuel cell stack; and a controller configured to control the generated power of the fuel cell stack by switching a generation state of the fuel cell stack based on the state of charge of the power storage device detected by the state-of-charge detecting unit, wherein the generation state includes:

a first generation state, in which the fuel cell stack is caused to generate a first generated power;

a second generation state, in which the fuel cell stack is caused to generate a second generated power, the second generated power being greater than the first generated power; and a third generation state, in which the fuel cell stack is caused to generate a third generated power, the third generated power being greater than the second generated power, wherein the controller is further configured to:

switch said generation state of the fuel cell stack from said second generation state to said first generation state when said state of charge of the power storage device is greater than or equal to a first threshold ($V_L$), switch said generation state of the fuel cell stack from said first generation state to said second generation state when said state of charge of the power storage device is less than or equal to a second threshold ($V_M$) smaller than said first threshold ($V_L$), switch said generation state of the fuel cell stack from said second generation state to said third generation state when said state of charge of the power storage device is less than or equal to a third threshold ($V_H$) smaller than said second threshold ($V_M$), and switch said generation state of the fuel cell stack from said third generation state to said second generation state when said state of charge of the power storage device is greater than or equal to said second threshold ($V_M$), and the controller includes:

a power reference value calculating unit configured to calculate a power reference value indicating an actual result of power generation of the fuel cell stack from the generated power detected by the generated power detecting unit; and an updating unit configured to update the second generated power based on the power reference value.

2. The fuel cell system according to claim 1, wherein the updating unit is configured to calculate a difference between the power reference value and a current value of the second generated power, add a value obtained by dividing the difference by a specified time to the current value of the second generated power, and set a new value of the second generated power to a value obtained by the addition.

3. A fuel cell system mounted on a fuel cell electric vehicle, the fuel cell system comprising:

a fuel cell stack;

a power storage device connected to a power line between the fuel cell stack and a load mounted on the fuel cell electric vehicle;

auxiliary devices configured to be driven by power supplied from the fuel cell stack; and a controller configured to control power generation of the fuel cell stack based on a state of charge of the power storage device and to control operation of the auxiliary devices, wherein the auxiliary devices include:

a first auxiliary device that is directly involved in power generation of the fuel cell stack; and a second auxiliary device that is not directly involved in power generation of the fuel cell stack, and the controller is configured to stop power generation of the fuel cell stack and drive the second auxiliary device when a regenerative power supplied from the fuel cell electric vehicle to the fuel cell system is greater than or equal to a specified power and acceleration of the fuel cell electric vehicle is less than or equal to a specified acceleration.

4. The fuel cell system according to claim 3, wherein the second auxiliary device includes more than one second auxiliary devices, and the controller is configured to stop power generation of the fuel cell stack when the regenerative power is greater than or equal to the specified power and the acceleration is less than or equal to the specified acceleration, and then drive, among the second auxiliary devices, one or more second auxiliary devices in accordance with an amount of charge of the power storage device.

5. The fuel cell system according to claim 3, wherein the controller is configured to increment a counter value when the regenerative power is greater than or equal to the specified power and the acceleration is less than or equal to the specified acceleration, decrement the counter value when the regenerative power is less than the specified power or when the acceleration is greater than the specified acceleration, and stop power generation of the fuel cell stack and drive the second auxiliary device when the counter value is greater than or equal to a first threshold.

6. The fuel cell system according to claim 5, wherein the controller is configured to prepare to drive the second auxiliary device when the counter value is greater than or equal to a second threshold, the second threshold being less than the first threshold.

7. The fuel cell system according to claim 3, wherein the power storage device is a capacitor.

8. A fuel cell electric vehicle, comprising:

a fuel cell stack;

a load;

a power storage device connected to a power line between the fuel cell stack and the load; and a travel controlling unit configured to control travel of the fuel cell electric vehicle, wherein the travel controlling unit is configured to determine that the fuel cell electric vehicle is traveling uphill based on a requested power that the fuel cell electric vehicle requests from the power storage device, a speed of the fuel cell electric vehicle, an accelerator operation amount of the fuel cell electric vehicle, and an acceleration of the fuel cell electric vehicle, and increase a generated power of the fuel cell stack from the current generated power when determining that the fuel cell electric vehicle is traveling uphill, wherein the travel controlling unit is configured to change the generated power of the fuel cell stack in a range of 0 to a maximum generated power in accordance with an amount of charge of the power storage device when determining that the fuel cell electric vehicle is not traveling uphill, and increase the generated power of the fuel cell stack to the maximum generated power when determining that the fuel cell electric vehicle is traveling uphill.

9. The fuel cell electric vehicle according to claim 8, wherein the travel controlling unit is configured to increment a counter value when the requested power is greater than or equal to a specified power, the speed is less than or equal to a specified speed, the accelerator operation amount is greater than or equal to a specified accelerator operation amount, and the acceleration is less than or equal to a specified acceleration, decrement the counter value when the requested power is less than the specified power, the speed is greater than the specified speed, the accelerator operation amount is less than the specified accelerator operation amount, or the acceleration is greater than the specified acceleration, and determine that the fuel cell electric vehicle is traveling uphill when the counter value is greater than or equal to a threshold.

10. The fuel cell electric vehicle according to claim 9, wherein the travel controlling unit is configured to determine that the fuel cell electric vehicle is not traveling uphill when the counter value is less than or equal to 0.

11. The fuel cell electric vehicle according to claim 8, wherein the travel controlling unit is configured to gradually increase the generated power of the fuel cell stack to the maximum generated power when determining that the fuel cell electric vehicle is traveling uphill.

12. A fuel cell system mounted on a fuel cell electric vehicle, the fuel cell system comprising:

a fuel cell stack;

a power storage device connected to a power line between the fuel cell stack and a load mounted on the fuel cell electric vehicle; and a controller configured to control power generation of the fuel cell stack, wherein the controller is configured to determine that the fuel cell electric vehicle is traveling uphill based on a requested power that the fuel cell electric vehicle requests from the power storage device, a speed of the fuel cell electric vehicle, an accelerator operation amount of the fuel cell electric vehicle, and an acceleration of the fuel cell electric vehicle, and increase a generated power of the fuel cell stack from the current generated power when determining that the fuel cell electric vehicle is traveling uphill wherein the controller is further configured to change the generated power of the fuel cell stack in a range of 0 to a maximum generated power in accordance with an amount of charge of the power storage device when determining that the fuel cell electric vehicle is not traveling uphill, and increase the generated power of the fuel cell stack to the maximum generated power when determining that the fuel cell electric vehicle is traveling uphill.

* * * * *